(12) United States Patent (10) Patent No.: US 7,760,699 B1
Malik (45) Date of Patent: Jul. 20, 2010

(54) SYSTEM AND METHOD FOR EFFICIENT TRANSMISSION OF ELECTRONIC INFORMATION

(76) Inventor: Sandeep Malik, 2000 Auburn Dr., Suite 200, Beachwood, OH (US) 44122

( * ) Notice: Subject to any disclaimer, the term of this patent is extended or adjusted under 35 U.S.C. 154(b) by 559 days.

(21) Appl. No.: 11/737,014

(22) Filed: Apr. 18, 2007

Related U.S. Application Data

(60) Provisional application No. 60/821,567, filed on Aug. 5, 2006.

(51) Int. Cl.
 *H04B 7/216* (2006.01)
(52) U.S. Cl. .................. 370/342; 370/335; 370/320; 455/403; 455/414.1
(58) Field of Classification Search .............. 370/342, 370/335, 320; 455/403, 414.1
 See application file for complete search history.

(56) References Cited

U.S. PATENT DOCUMENTS

| | | | |
|---|---|---|---|
| 6,307,487 | B1 | 10/2001 | Luby |
| 7,068,729 | B2 | 6/2006 | Shokrollahi |
| 2004/0028013 | A1* | 2/2004 | Fitton et al. .......... 370/335 |

OTHER PUBLICATIONS

Srinath Puducheri, et al., Distributed LT Codes, Department of Electrical Engineering, University of Notre Dame, Notre Dame, IN 46556, USA.

Fricke, et al., An Uplink Proposal Based On Adaptive Interleave-Division Multiple Access, Wireless World.

Christina Fragouli, et al., Network Coding: An Instant Primer, infoscience.epfl.ch.

Christoph Hausl, et al., Iterative Network and Channel Decoding on a Tanner Graph, Institute for Communications Engineering (LNT), Munich University of Technology (TUM), 80290.

Xingkai Bao, et al., Matching Code-on-Graph with Network-on-Graph: Adaptive Network Coding for Wireless Relay Networks, Department of Electrical and Computer Engineering, Lehi.

Anwar Al Hamra, et al., Network Coding for Wireless Mesh Networks: A Case Study, Department of Informatics, University of Oslo-Norway.

Rudolf Ahlswede, et al, Network Information Flow, IEEE Transactions on Information Theory, vol. 46, No. 4, Jul., 2000.

Sachin Katti, et al, The Importance of Being Opportunistic: Practical Network Coding for Wireless Environments, MIT, university.

Yingda Chen, et al, Wireless Diversity through Network Coding, Department of Electrical and Computer Engineering, Lehigh University, Bethlehem, PA 18015.

* cited by examiner

*Primary Examiner*—Nghi H Ly
(74) *Attorney, Agent, or Firm*—Robert J. Koch

(57) ABSTRACT

A system and method for efficient transmission of electronic information comprises providing a controller 10 being capable of receiving and transmitting electronic information, providing a plurality of access points 20, each access point having a plurality of receivers 30 capable of receiving electronic information, one of said plurality of receivers being designated a primary receiver 40, the rest being designated secondary receivers 50.

31 Claims, 33 Drawing Sheets

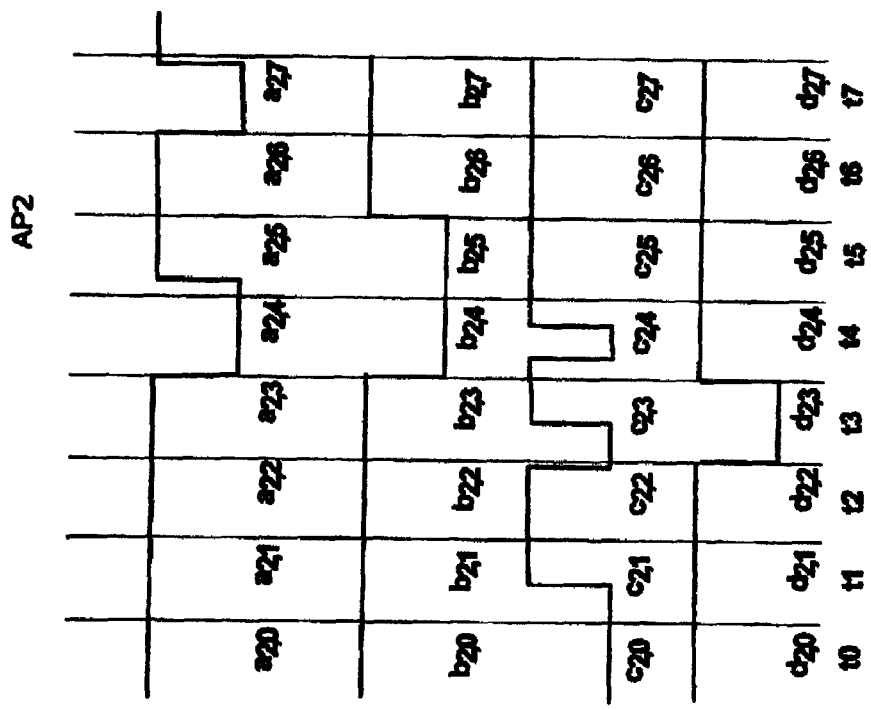
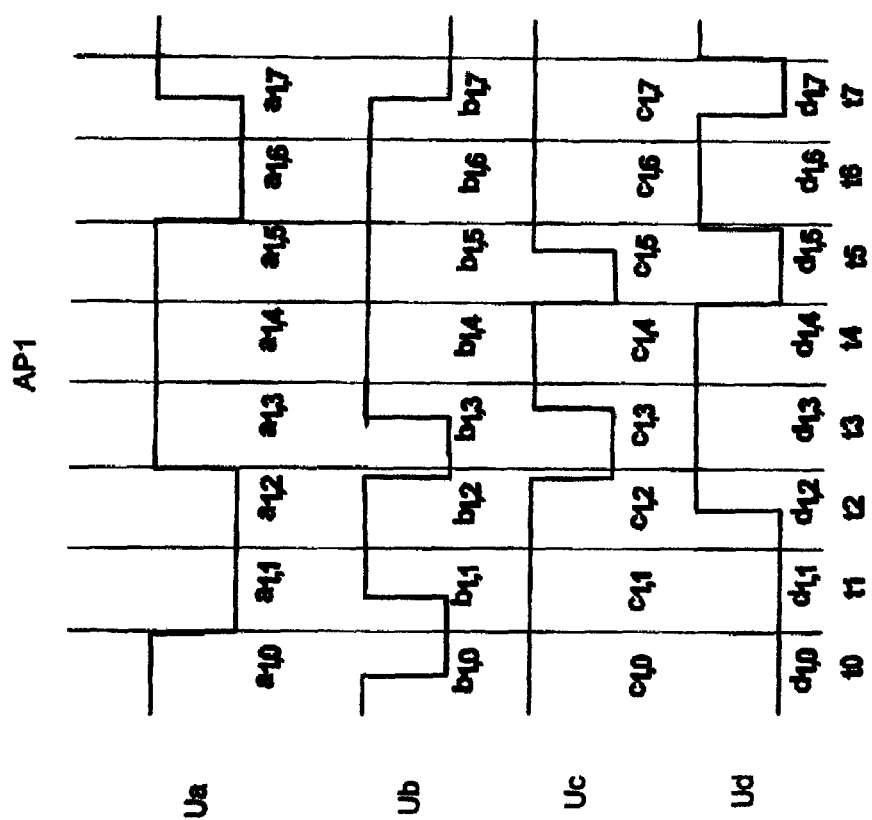
FIG. 5

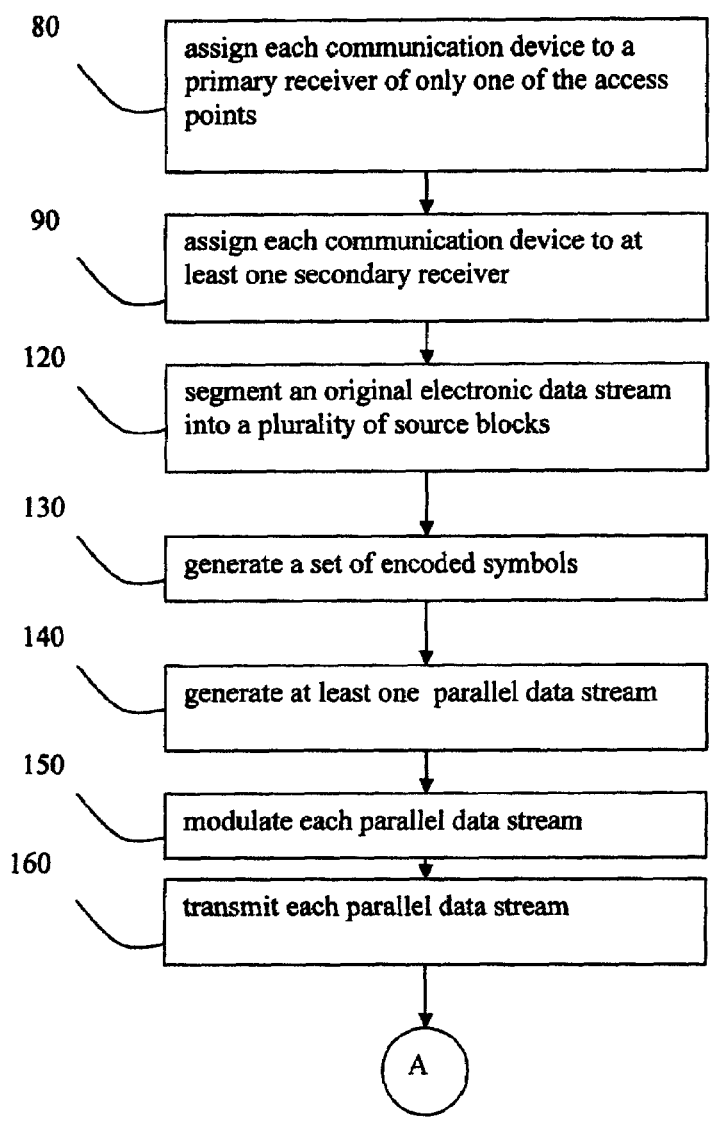

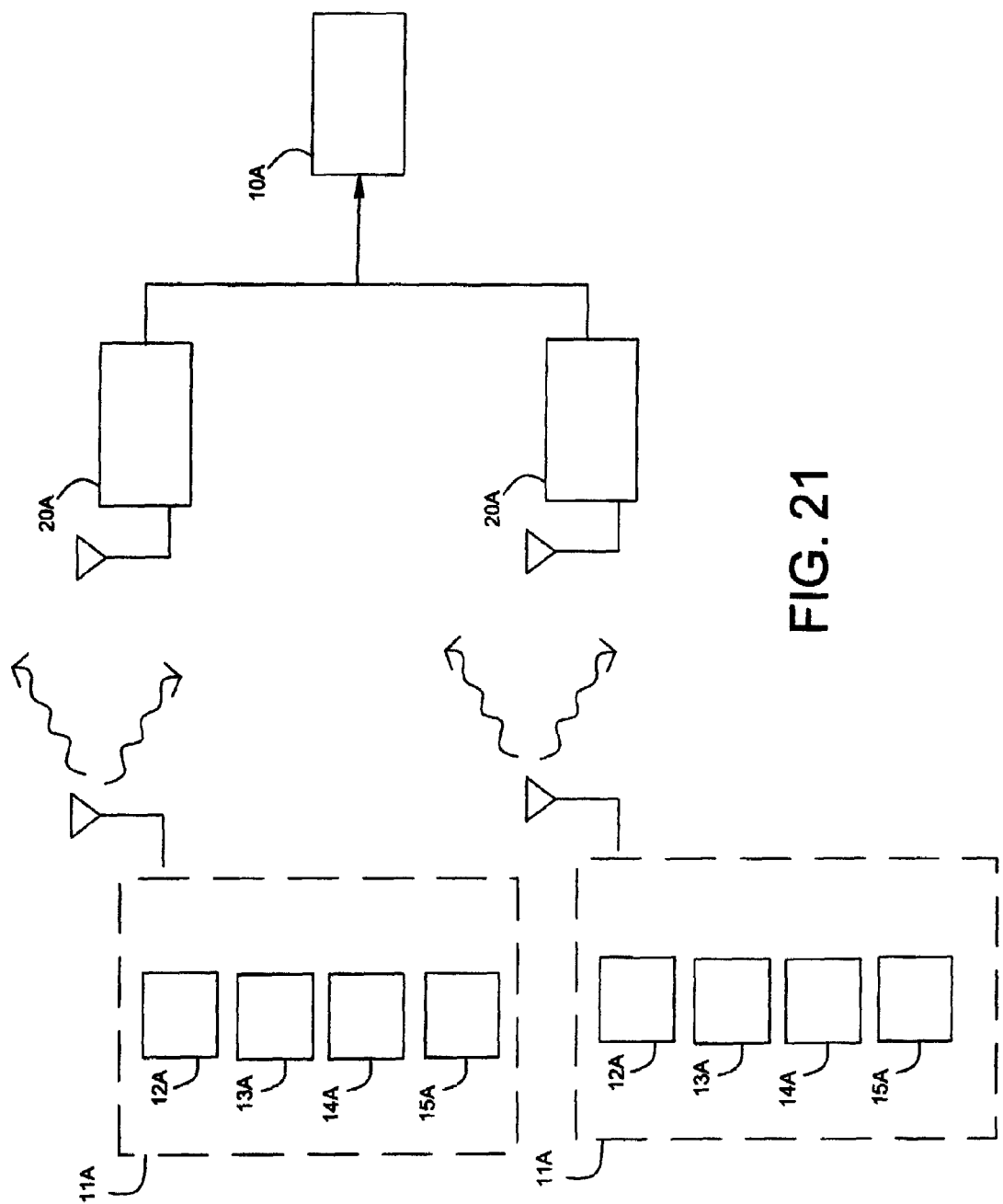

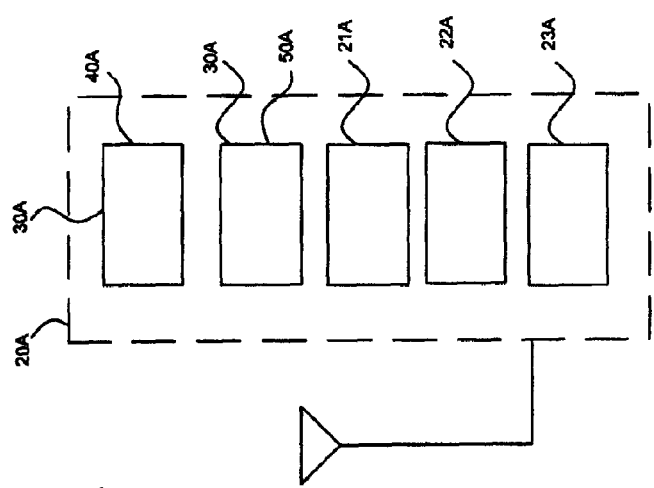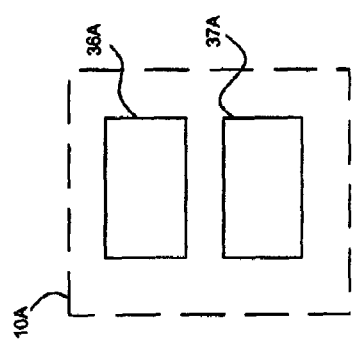
FIG. 22A
FIG. 22B

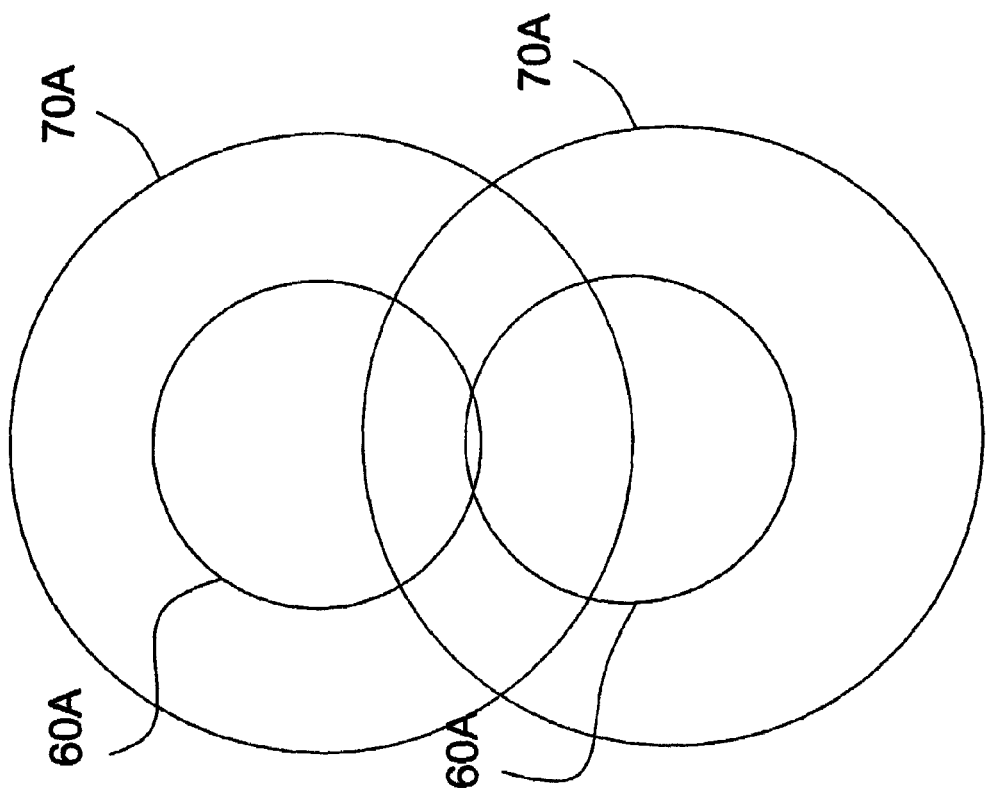

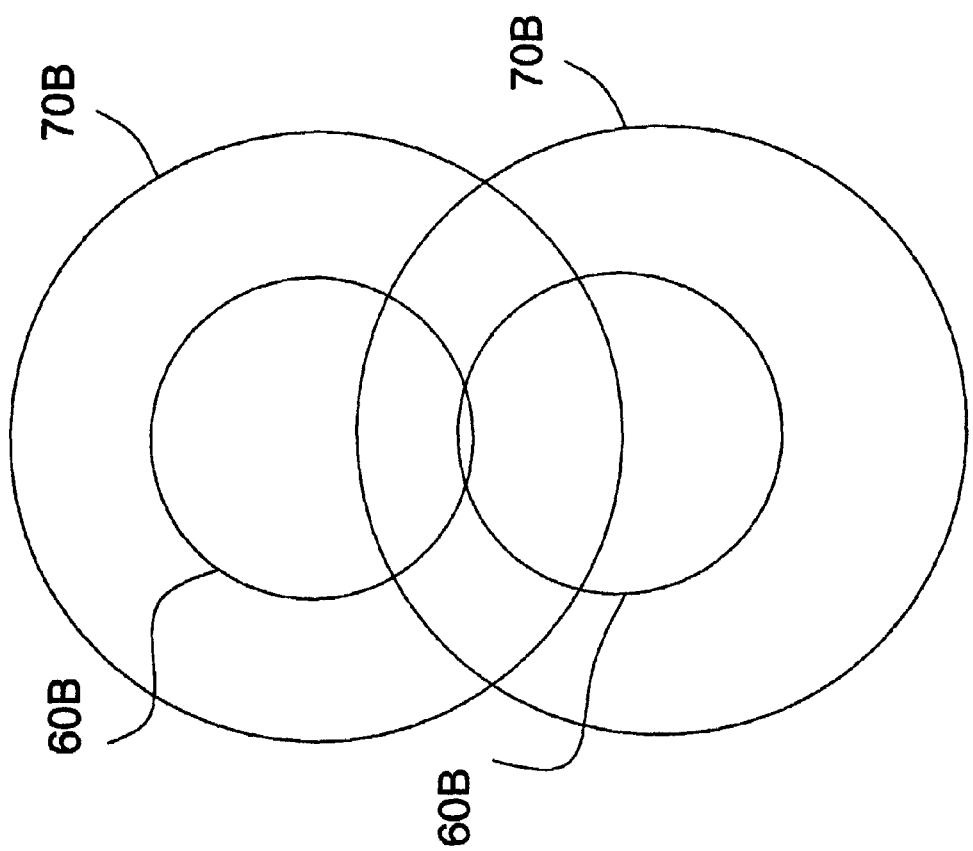

SYSTEM AND METHOD FOR EFFICIENT TRANSMISSION OF ELECTRONIC INFORMATION

CROSS REFERENCE TO RELATED APPLICATIONS

Provisional application No. 60/821,567, filed Aug. 5, 2006

FEDERALLY SPONSORED RESEARCH

Not applicable

SEQUENCE LISTING, TABLE, OR COMPUTER PROGRAM COMPACT DISK APPENDIX

Not applicable

CLAIM OF PRIORITY BASED ON COPENDING PROVISIONAL APPLICATION

The present application is related to the co-pending Provisional patent application No. 60/821,567 of Sandeep Malik, filed Aug. 5, 2006, entitled "System And Method For Improved Network Architecture", and based on which priority is herewith claimed under 35 U.S.C. 119(e) and the disclosure of which is incorporated herein by reference in its entirety as if fully rewritten herein.

BACKGROUND AND SUMMARY

The present invention is in the area of computer and/or communication device networks and more specifically wireless networks. A system and method to implement a type of Mesh Network generally embodies a Mesh Networks [MN] architecture that utilizes additional uplink receivers and Network Coding (See Anwar A 1 Hamra, Chadi Barakat and Thierry Turletti, Network coding for Wireless Mesh Networks: A Case Study, 2005). This network topology could also be integrated into Wireless Wide-Area Network [WWAN] topology to serve areas with high user-density.

Acronyms: the following table lists some helpful acronyms.
  MN: Mesh Network
  WWAN: Wireless Wide Area Network
  WLAN: Wireless Local Area Network
  DAS: Distributed Antenna System
  MPWU: Mobile/Portable Wireless Unit e.g. Cell-Phones, Smart Phones, Laptops
  MIMO: Multiple Input/Multiple Output—Advanced Antenna Technology using multiple transmitting or receiving antennas at the transmitter and receiver
  AP: Access Points
  MUD: Multi-User Detection—Advanced Signal Processing technology used at a Wireless Receiver. It involves interference cancellation and noise reduction.
  TDMA: Time Division Multiple Access
  FDMA: Frequency Division Multiple Access
  CDMA: Code Division Multiple Access
  SDMA: Spatial Division Multiple Access
  TDD: Time Division Duplex
  FDD: Frequency Division Duplex
  FH: Frequency Hopping
  TH: Time Hopping
  SDR: Software Defined Radios Several articles propose network coding applied to both a wireless network containing DAS and user cooperation between users schemes (See Yingda chen, Shalinee Kishore and Jing Li, Wireless Diversity through Network Coding, 2004). In a typical embodiment, either a relay station is deployed within a cell-coverage area or Mobile Devices are used as relays to provide diversity in accessing the network (cooperative-diversity strategy). These systems are difficult to implement due to the following reasons:

1. Such systems require more processing power on mobile units. i.e. decode/demodulate uplink from another user that increases the complexity of the devices. Since the mobile device market is very price sensitive, it may not be realistic.

2. Mobile devices are battery power limited. To reduce battery consumption less processing is required.

3. Inter-user channel conditions might be challenging and may require Advanced Antenna Technologies for a reliable link. Small size of the Mobile Devices does not allow sufficient spacing between antennas for MIMO or Advanced Antenna Technologies. Therefore, inter-user channel conditions may not provide sufficient reliable connections.

4. Security and privacy is another issue. Cooperative-Diversity techniques require a mobile to receive other users' data before it relays that data to its destination. This allows one user to decode other users traffic data, hence, raising an issue of privacy.

5. Deployment of relay stations within each cell is expensive in terms of additional equipment and maintenance cost.

6. Recently, there has been an emergence of multi-mode mobile devices with a capability of accessing two different technologies such as Cellular-WWAN and WLAN. As mentioned earlier, due to limited battery power, these devices do not operate in both modes at the same time. Therefore, switching between WLAN to WWAN is very expensive.

Although, most of the above issues are related to cellular type communication systems, they are relevant to any portable wireless device used in any type of network such as Mesh-Networks or WLAN.

FIG. 1 shows a basic unit of the network topology that consists of a set of Access Points (APs) connected to a Network Controller. This network is synchronous i.e. all units within the network are synchronized to each other, although, asynchronous units may use the same architecture. Each AP's service coverage area is called a cell. The Controller could be connected directly to an external network such as the Internet or via a Core Network. APs get access to the Internet via the Controller. The Controller manages some MAC layer, bridging, scheduling and various other functions that require system-wide visibility. Alternately, a set of APs may form a mesh network and one of the APs may become the Master that performs tasks similar to a Controller. In this type of network a Master controlling a set of APs forms clusters. Each cluster is connected to another cluster via a common AP called bridge-AP. This type of MN is called de-centralized MN (discussed below).

In this embodiment, a separate unit is considered as a Controller that is connected to all the APs via a backhaul. This backhaul could be wired or wireless (such as IEEE 802.16d or IEEE802.11a type Air-Interface). The embodiment described uses a wired backhaul. However, the present invention is much more effective for wireless backhauls. It is also assumed that the backhaul is a more reliable channel than the channel between the user and the APs. This is not a necessary requirement. Mobile/Portable Wireless Devices access APs using IEEE 802.11b/g/n or any other WLAN Air-Interface. In another embodiment, the same concept could be used for WWAN topology (discussed below).

The present invention applies the following changes to the topology:

1. Each AP uses one (or more but not required) Transmitter for Downlink (AP to Mobile Unit) and multiple receivers for the Uplink (Mobile Unit to AP). One of the receivers is paired with the only transmitter and it is referred to as Primary Receiver. The additional receivers are used to receive data traffic signals from the users of the neighboring cells. These receivers are referred to as Secondary Receivers. Some important features:

a. Due to advances in Receiver Technologies (such as MUD and Advanced Multiple Antenna Technology) it is possible to have high performance receivers.

b. The coverage areas of the Secondary Receivers (dashed line ellipse in FIG. 1) may be different from Primary Receivers (solid circle in FIG. 1). It is desirable to have larger coverage for secondary receivers than primary receivers. However, this is not essential, only preferred.

The receivers in each AP use Multiple Advanced Antenna technologies such as MIMO and/or SDMA.

These APs with additional Receiver are used as relays for their neighboring cells. The neighboring cell is allowed to receive uplink data from a set of users that are located at the edge of a neighboring cell. A diversity gain is achieved when all the neighboring cells receive data from edge-users from the other cell and relay the same data to the Controller.

Each AP uses network coding to relay the collected information from various users of different cells in addition to its own traffic. This is achieved by sending a linear combination (e.g. XOR SUM) of received data from multiple users and its encoding vector i.e. $X_k = \sum_{i}^{n} g_i * M_i$, where $M$ and $X$ is the kth symbol of $M_i$ and $X$ respectively. Coefficients $g = (g_i, \ldots, g_n)$ is called the encoding vector and $X$ is the information vector.

FIG. 2 shows the basic concept of a preferred embodiment of the present invention. AP1 is serving users Ua and Ud. AP2 is serving users Ub and Uc. Both APs have two receivers as described above with different coverage areas. Note this scenario could be extended to more than 2 APs located in 2-D (malls, city, etc.) or 3-D (buildings, within airplanes and ships, etc.) space.

Each user transmits data represented as vectors a, b, c and d. AP1 and AP2 use multiple receivers to receive data from their respective users as well as from users of served by other APs. Note if this situation is extended to more than 2 APs (especially in 3-D space) then each AP could receive data from users of multiple APs. These APs in addition to their own users data traffic send data of the users of other APs to the Controller using network coding.

Various multiple access techniques exist to support communications in MN. An FDMA scheme, by way of example, is a very common technique. FDMA typically involves allocating distinct portions of the total bandwidth to individual communications between two units. In the above case, AP1 could operate freq1 band and AP2 could operate in freq2 band where freq1 and freq2 are separate portion of total channel bandwith frequencies. Another extension is to use FH to reduce interference i.e. each AP "frequency-hop" by communicating in random frequency subbands at a given time-interval.

A TDMA (time division multiple access) scheme is another common access scheme. TDMA scheme typically allocates entire bandwidth to each communication channel between two units at designated time interval. A Controller may schedule transmissions for each AP in such a way that does not cause excessive inter-APs interference. For example, a Controller schedules AP1 to transmit/receive when AP2 is not and so on. This is achieved by assigning time slots to each AP within a time frame. Some networks may use time hopping (TH) to reduce interference. i.e. each APs transmissions "time-hop" to random time slots independently. This technique reduces the chances of two neighboring APs communicating with their users at the same time.

The CDMA (code division multiple access) technique allows a device to communicate by transmitting a signal with a different code that modulates a carrier, and thereby, spreads the signal. At the receiver's demodulator corresponding code is used to de-spread the desired signal. The undesired signals, whose codes do not match, are not de-spread and contribute only to noise. In one preferred embodiment, each AP could be assigned separate codes and each user accessing a particular AP spreads it transmission by corresponding code.

Additionally, in FDD (Frequency Division Duplex) a portion of freq1, say freq1_d, is devoted to downlink (AP to User) and another portion of freq1, say freq1_u, devoted to uplink (User to AP). An uplink receiver within an AP could use filters (RF/IF or Baseband Domain) to receive data in both freq1_u and freq2_u. Another implementation could involve separate receivers tuned to freq1_u and freq2_u.

TDMA-FDD Implementation (FIG. 3). In another preferred embodiment, TDD (time division duplex) is used. It is a technique where a portion of a time interval is assigned to downlink and another portion to uplink.

Note that a mesh network could use any of the above schemes and it may also use a combination of the above schemes. For example, FDMA (AP1 serving on freq1 and AP2 serving on freq2) in conjunction with TDMA-FDD (one MPWU is served per time-slot in each cell with separate uplink and downlink frequencies).

Turning now to FIG. 1, each AP has multiple receivers and their backhaul is connected to a Controller. AP1 receives data from its own users on its primary receiver. i.e. users that are assigned to be served by AP1. Note that the coverage area served by AP1 is same for downlink and uplink. However, AP1 also receives data from users that are assigned to AP2 and AP3. AP1 uses secondary receivers to receive signals from users that are located at the boundary of AP1 & AP2 and AP1 & AP3. Secondary receivers may use advanced MUD or Multiple Advanced Antenna Techniques that can extend their coverage into neighboring cells. Similarly, AP2 and AP3 receive signals on primary and secondary receivers from its assigned users and users from neighboring cell respectively.

If FDD is used, AP1's primary receiver tunes to frequency band freq1_u and transmits signals on freq1_d (frequency-pairs). AP2's secondary receiver also tunes to frequency band freq1_u to listen to the same user that is assigned to AP1.

If TDMA is used, one MPWU (Mobile/Portable Wireless Unit e.g. Cell-Phones, Smart Phones, Laptops—also referred to herein throughout as "communication device") transmits a packet that is a set of sub-packets (or data symbols) during each time-slot within each cell. [Note that MPWU is used as an example device and any other wireless device could use this technique such as a AP communicating with multiple APs within a MN] Corresponding APs listen to their respective MPWU on primary receivers. Also, during the same time slot APs receive sub-packets from MPWUs located at the edge of neighboring cells using secondary receivers. As mentioned, secondary receivers are "tuned" to a different frequency subband than that used by the primary receiver. Within each cell, individual MPWUs transmit in different frequency subbands during the same time-slot to avoid inter-cell interference (FDMA Scheme). Depending upon quality of channel conditions, each AP receives part or all of sub-packets of a packet.

For example, if the distance is large between the AP and MPWU then the channel conditions might be challenging.

FIG. 4 shows various functional blocks within a typical Mobile/Portable Wireless Unit (MPWU), AP and the Controller for an implementation.

In operation, using a downlink feedback signaling from the AP (not shown), each MPWU selects (the selection may be dictated all or in part by the controller) a coding and modulation format to transmit sub-packets within a data packet belonging to data blocks a, b, c and d from Ua, Ub, Uc and Ud respectively. This format could be selected with certain parameters such as coding rate, modulation order, and data rate, etc. The selection of each format depends upon channel conditions between the AP and MPWU, and/or type of application (low-latency voice call or huge data file download), etc.

As mentioned previously, the Controller has system-wide visibility and it can acquire knowledge about each MPWU within each cell. Multiple neighboring APs could monitor uplink channel conditions from a MPWU and report back to the Controller their channel conditions. Primary AP and neighboring APs could monitor control/pilot beacons (or signals) transmitted by each MPWU. Using this information the Controller could use a scheduler that assigns one AP to use primary receiver and another set of APs to use secondary receivers for that particular MPWU. Main AP provides both uplink and downlink and APs provide just uplink connection to the MPWU.

Data packet formats could be predefined and stored in a Look-Up Table (LUT). All APs have access to the same LUT that assist in demodulating and decoding the data packets. A preamble within a packet indicates format type and an index with respect to data block (i.e. position of that particular subpacket within the data block). LUTs located in each AP help to decode and demodulate a packet received from a MPWU of the neighboring cell. With respect to coding, various Error Correcting Codes could be used such as Reed-Solomon Block Codes, Convolution Codes, Turbo Codes, Low-Density Parity Check, Irregular Repeat Accumulate (IRA-code) or Rateless codes (also called Raptor Codes or Chain-Reaction codes).

One preferred embodiment comprises using rateless codes and each user having a source block of information to transmit to the Controller. Each source block is further divided into symbols called source symbols (group of bits or bytes). By rateless coding we mean that a set of source symbols could be encoded into a large set of coded symbols. These coded symbols set consist of original source symbols and a large number of redundant coded symbols. Note the code rate i.e. number of original source symbols over number of transmitted coded symbols is very low. The term "rateless" is typically used to signify a large number or as many required of redundant coded symbols could be transmitted. Raptor Codes is one type of rateless Codes where encoded symbols are created by randomly XOR'ing selected source symbols to each other. (Rateless Coding is known in the art). There terms coded symbols and packets are interchangeable. This process could produce as many coded symbols as required. These encoded packets are further divided into smaller sub-packets that are transmitted using modulation symbols at the physical layer.

There are other methods to produce low code rate symbols known in the art. For example "Lifting" could be used to generate a large LDPC. First several copies of a small "base code" are generated with a fixed code rate, say (k/n). Using systematic-parity-check matrix representation, each non-zero entry in the parity-check matrix is replaced by a L×L permutation matrix. This process generates new block of coded symbols with a code rate $(L*k)/(L*n)$. Note this technique generates a new set of coded symbols that could be used to represent a large information source symbols. However, in this case some of these coded symbols may or may not be unique unlike in Raptor code case.

The general idea is that a large number of coded symbols relative to original number of source symbols are transmitted. In case a very small size of original information, a multiple copies of the same source symbols could be transmitted. Not this is a special case when each transmitted code symbols are not unique. To summarize, one case where an unlimited number of coded symbols are available (Raptor codes, LT-codes), another case where a large number but limited number of coded symbols (Lifted-LDPC) are available and then just a repetition codes case where simply multiple copies of a short original information block could be used. We will refer to all these cases as rateless coded symbols in the rest of the document.

Referring now to FIG. 2, one preferred embodiment comprises one procedure how a MPWU may transmit its data blocks:

1. MPWU Ua wants to upload a block of data using Rateless Codes. Channel condition between the MPWU Ua and AP1 and AP 2 are reported to the Controller by the respective APs. [Reporting channel conditions maybe done at packet-to-packet, subpacket-to-subpacket, frame-to-frame or even multiple framesto frames basis]. Note in TDD mode Ua could sends this information to the Controller using uplink control signals with AP1.

2. The Controller assigns Ua to AP1 and AP2 as primary and secondary AP respectively. Upon this assignment, AP1 provides downlink and uplink service to Ua and AP2 provides uplink service to Ua. Note, Ua may or may not be aware that AP2 is also listening to its transmissions.

3. The Controller sends commands to Ua using AP1's downlink. The commands indicate what type of packet format to be used to transmit data blocks by Ua. For example, the controller may decide Ua to use rateless codes and QPSK modulation. This packet format information and schedule information about Ua's transmission is shared with AP2 by the Controller.

4. Step 1, 2 and 3 are performed by all the MPWUs and APs within the network. Typically, a set of APs and their respective MPWUs are controlled by one Controller and may repeat the foregoing steps periodically or per data or frame session basis.

5. Ua begins transmitting data packets using QPSK modulation and Rateless codes. Similarly, Ub, Uc and Ud may do the same. AP1 and AP2 gathers unique subsets of sub-packets (or symbols) transmitted by Ua since each subset takes an independent wireless channel path to each AP (Data Symbols and sub-packets terms are interchangeable). This is true for all Ub, Uc and Ud.

FIG. 4 shows the architecture of APs that receive data packets from MPWUs (assigned to corresponding AP) on primary receiver and data packets from neighboring-cells users on secondary receivers.

In one preferred embodiment, a collaborating decoding method is used whereby each user transmits encoded packets using channel Coding such as Convolution Codes (e.g. Turbo Codes) or Low-Density Parity-Check Codes. Each AP tries to decode packets by using decoding algorithms such as Viterbi or Belief-Propagation Algorithms and check packet's CRC (Cyclic-Redundancy-Check). If the packet is decoded correctly then it is stored. Decoding is performed for all the packets received on both primary and secondary receivers.

Then each AP randomly selects a fixed number of stored packets with same packet format-types, and transmits their linear combination and corresponding encoding vectors to the controller (preambles are included) using wired or wireless backhauls. The backhaul link may have its own protocol and coding scheme. All APs may send data to the Controller packet-by-packet or subpacket-by-subpacket basis.

The Controller receives these linear combinations of packets and uses them to decode original data blocks. For example, in FIG. 3, the controller receives packets belonging to both blocks a and b from AP1 and linear combinations of packets belonging to blocks a, b, c and d from AP2. Similarly, packet sets c and d are received from AP2 and linear combinations from AP1. Using Gaussian Elimination or Belief-Propagation Algorithm based Iterative Decoders could be used to decode all a, b, c and d. The performance of the scheme depends upon a trade-off between independent and dependent linear combinations.

Referring now to FIG. 5, time-diversity for subpackets received by AP1 and AP2 from Ua, Ub, Uc, and Ud users are shown. As shown, within each timeslot (t0, t1, ..., t7) each AP (AP1 and AP2) receive packets from users Ua, Ub, Uc, and Ud represented by vectors a, b, c, and d subscripted AP and timeslot i.e. a (subscript) AP,timeslot. A high line represents that a packet is decoded correctly (i.e. CRC is correct) within that timeslot and if low, then it is not decoded correctly.

Using timeslot 3 as an example, AP1 received a(subscript) 1,3 and d(subscript) 1,3 received correctly. Then, AP1 can send a linear combination x(subscript) 1,3 (=a(subscript) 1,3 XOR d(subscript) 1,3) to the Controller. Notice, AP2 received a(subscript) 2,3 correctly but not d(subscript) 2,3. Therefore, the Controller can obtain d(subscript) 2,3 by XOR'ing x(subscript) 1,3 and a(subscript) 2,3.

The foregoing method increases the probability of receiving a packet from both Ua and Ud in timeslot 3 for given resources (time and bandwidth). A linear combination may be obtained by XOR'ing more than two packets. Also, receiving a packet from the neighboring AP may help decoding some of the previous or future packets and, as a result, help in decoding the whole block much faster (Since packets themselves a XOR-SUM of original packets using Rateless Encoding). This method is a very efficient De-centralized Mesh Networks (described later).

It is also possible to incorporate additional functional units for further processing such as Channel Interleavers, Channel Inner Coding, Repetition units for links between the APs and Controller. The decision to incorporate these units is in part derived upon channel conditions as well as other system conditions.

In one preferred embodiment, TDD Mode is incorporated. Consider two neighboring cells within a WLAN operating in TDD mode (i.e. Downlink and Uplink are time-division on the same frequency band). Consider two cells next to each other, Cell A and Cell B serve their respective users by transmitting and receiving data on frequency Fa and Fb respectively with coverage area radius Rf. In addition, each cell is used as a relay node for uplink traffic from the users of the neighboring cell. Cell A receives data from users from the neighboring Cell B on frequency Fb with coverage area with radius Rr. Similarly, Cell B receives data from the users from the neighboring cell on frequency Fa with coverage area with radius Rr. Please note Rr>=Rf.

In one preferred embodiment, the same concept could be used in WWAN. However, at the edge of the cell, Fractional Frequency Reuse (FFR) is used to avoid interference (i.e. each user located at the edge of the cell is assigned a set of frequency subbands that is orthogonal to set of frequency subbands assigned to the users at the edge of other cell). Each cell listens to its own users subbands as well as subbands of the other cell's edge-users. In this case, neighboring cell's secondary receivers receive signals on all the subbands used by users of the other cell. Note that primary and secondary receiver could be integrated into one single receiver.

In one preferred embodiment, Mesh-Network Access Point is used as a relay for WWAN.

An AP within a MN modified to receive signals from users that are transmitting an uplink signal to a WWAN Base Station. These modified APs can "eavesdrop" the uplink signals from multiple users within a WWAN cell. Then, a linear combination of the acquired uplink packets is formed and relayed to the Base Station using a backhaul connection to the Base Station. In this case, the Mobile is not required to switch to WLAN radio and still achieve a diversity gain by using additional independent uplink path via WLAN AP.

In one preferred embodiment, a De-centralized Mesh Network is employed. FIG. 6 shows a MN Architecture where each AP is connected to another via backhaul. A backhaul may use another wireless technology and/or frequency which is different from MPWU to AP access. As mentioned before, a MN may use one of the AP as a Controller. In that case, each AP could be equipped with its own Iterative Decoder. This Iterative Decoder could receive linear combinations of packets from the neighboring APs via backhaul.

In one preferred embodiment, a distinct advantage is achieved whereby:

1. The whole network topology that includes multiple receivers at APs and network coding is used to send backhaul data traffic. This topology creates an advantageous environment (a distinct advantage over the prior art is thereby achieved).

MPWUs at the cell-boundary are equidistant from two adjacent APs; therefore, channel condition statistics between the MPWU and the serving AP and neighboring APs are very similar. This facilitates the setting of similar coding, modulation, and scheduling parameters to those cell-edge MPWUs.

Secondary receivers coverage is at least as good as primary receivers or better. Secondary receiver coverage should overlap at least one of the neighboring cells coverage.

This topology allows each AP to exchange and share data packets of those users that have similar channel conditions across multiple cells with each other. This collaboration helps in decoding data packets due to same packet formats (coding rate, modulation order, etc.).

It is important to note that this concept could be applied at sub-packets level also using soft-decision decoders. However, the complexity of the design goes up drastically.

2. A scheduler (as will be appreciated, "scheduler" as used herein refers to a function that can be accomplished through a controller or separate hardware and/or firmware function) assigns primary and secondary APs to each MPWU in multiple cells. This simplifies an APs decision as to which packets (or subpackets) to use to form network coding packet combinations during each time frame.

3. Network coding reduces the overhead of data that needs to be exchanged to perform collaboration decoding. In one decoding method, an AP can randomly select packets since all stored packets are correctly decoded. In another decoding Method, an AP selects only those packets with high-reliability thus ensuring good chances of success at the Controller. Thus, the above selection of packets reduces any exchange of information needed between the Controller and the APs. The Controller assumes only "best" packets are sent by each AP.

4. AP's secondary receivers receive signals from users of neighboring cell(s). Extended coverage of secondary receivers into neighboring cells for uplink not only provides path-diversity but also helps in creating additional information for Collaborative-Decoding. It is believed that the foregoing presents a distinct advantage.

5. In this embodiment, a higher performance is achieved with no additional cost to the MPWUs.

6. In this embodiment, diversity gain is achieved without additional Relay Station deployment or Mobile-Cooperation (to better understand this concept, see generally, Yingda chen, Shalinee Kishore and Jing Li, Wireless Diversity through Network Coding, 2004). the relay units are integrated into the APs.

7. Network Coding between APs and the Controller is being used to provide "redundant" packets to help in decoding the original data blocks at the Controller.

8. This embodiment presents a method to integrate a mesh network into a cellular network.

9. If one AP does not have direct line-of-sight link with a MPWU, then another AP that has a direct line-of-sight may provide a better communication link. Thus, the hidden-nodes problem is solved.

whereby, the foregoing presents a preferred embodiment having distinct advantages over the prior art.

The following references are insightful regarding the understanding of the foregoing concepts:

1. Anwar A l Hamra, Chadi Barakat and Thierry Turletti, Network coding for Wireless Mesh Networks: A Case Study, 2005
2. Yingda chen, Shalinee Kishore and Jing L i, Wireless Diversity through Network Coding, 2004
3. Xingkai Bao and Jing L i, Matching Code-on-Graph with Network-on-Graph: Adaptive Network Coding for Wireless Relay Networks, 2004

A system and method to improve performance of uplink within a Mesh-Network is presented by the present invention. This is achieved without any additional cost to the wireless handset devices. Due to power constraints and size it is desirable to reduce the power consumption and complexity of portable devices. This method allows the system to "offload" handset complexity on to Access Points [APs]. APs does not have the same power and size constraints as the handset. Therefore, enhancing the processing capabilities of the AP's receiver is not considered expensive.

The present invention could be used for any access technique system such as TDMA, FDMA, CDMA and or SDMA. Any duplexing method is also allowed such as TDD or FDD. Thus, the present invention provides flexibility and backward-compatibility to the current architectures.

A concept known in the art termed "network coding" (see generally R. Ahlswede, N. Cai, S-Y. R. L i, R. W. Yeung. Network Information Flow. IEEE Trans. On Information Theory, 46(4): 1204-1216, July 2000) is utilized whereby the achievable throughput in a network is increased. The basic idea is that intermediate nodes in a network are used not only to route but also to perform coding operations on the incoming data.

In addition to network coding, advanced antenna technologies such as MIMO and Multiuser Detection techniques are used to improve the performance of the link between a small portable wireless device and an AP. Several papers have proposed the concept of joint decoding of network and channel coding (see generally C. Hausl, F. Schreckenbach, I. Oikonomidis. Iterative Network and Channel Decoding on a Tanner Graph. December 2004).

The following publication, 'Iterative Network and Channel Decoding on a Tanner Graph', C. Hausl, F. Schreckenbach, I. Oikonomidis, G. Bauch, December, 2004 (herein: "Hausl '04") is illustrative.

A preferred embodiment of the present invention is presented wherein LDPC codes are used for channel coding at each MPWU. Each AP decodes all of the MPWUs data using both primary and secondary receivers. After decoding, estimated subpackets are obtained at each AP. These estimated subpackets received from different MPWUs are network-encoded by linearly combining them and transmitting them to the Controller. These combined subpackets provide additional parity-check codes along the original subpackets sent to the Joint Network-Channel decoder located at the Controller.

The main difference between this preferred embodiment and [Hausl '04] is that the secondary receivers within the APs act as "relays". The scheme presented in [Hausl '04] is used for WWAN environment whereas the above is used for WLAN based MNs. Coverage of all APs overlap each other due to secondary receivers providing much more diversity.

Referring now to FIG. 7, a preferred embodiment using multi-code transmission is disclosed. In a multi-code transmission, a set of orthogonal codes (e.g. Walsh codes) is used to generate multiple code channels that are spread onto the same carrier frequency and transmitted as a combined signal. A set of receivers may recover selected code channels by correlating the combined received signal with the corresponding code(s).

Using multi-code transmission scheme, each MPWU transmits multiple independent streams of encoded packets generated by a rateless codes encoder. As shown in FIG. 7, a data source is encoded by a rateless codes encoder and then de-multiplexed into multiple streams. Each stream is channel encoded, interleaved and modulated. These streams are spread using Walsh Codes (C (subscript) 1 and C (subscript) 2) and transmitted as a combined signal. For illustration, this embodiment implemented in the embodiment depicted in FIG. 4 both AP1 and AP2 receive a combined signal from an MPWU However, AP1 and AP2 recover only selected code channels by correlating with code C1 and C2 respectively. This is an important distinction.

This embodiment ensures each AP receiving different sets of packets from the same MPWU This situation is similar to "soft-handoff" in a cellular system. During soft-handoff, a mobile moving from one cell to another transmits signals to both base stations. Both base stations send data received from that particular mobile to the Controller. At the Controller, the "better" of the two copies is selected or coherently combined to generate an improved signal (this needs synchronization between the two base stations). In the present embodiment, each AP receives a different set of packets that are sent to the Controller using Network coding. Each packet received from both APs assist in decoding the traffic. It is important to note that the foregoing principles could also be used in current cellular systems during soft-handoff.

FIGS. 8 and 9 depict a preferred embodiment wherein functional blocks of MPWUs Ua and Ub (FIG. 8) that are "associated" with access points AP1 and AP2 respectively. Other MPWUs (not shown) are also transmitting to both APs. Data source symbols are encoded using rateless codes encoder to generate a stream of encoded symbol packets. Alternate encoded symbol packets are separately channel coded using block convolution codes, interleaved and then spread by Walsh codes C (subscript) 1 and C (subscript) 2 respectively. This generates two independent streams of encoded packets that are modulated and transmitted by MPWU Ua in same frequency band. Similarly, Ub uses Codes $C_3$ and $C_4$ to transmit its two independent streams of encoded packets.

In FIG. 9, functional blocks of the two APs and a Controller are shown. AP1 uses its primary receiver and AP2 uses its secondary receiver to receive packets from MPWU Ua. AP1 uses Walsh code $C_1$ and AP2 uses Walsh code $C_2$ to de-spread Ua signal respectively. Similarly, Ub encoded packets are de-spread by primary receiver of AP2 and secondary receiver of AP1 using $C_3$ and $C_4$ respectively. After de-spreading, each stream is de-interleaved and channel decoded to obtain estimated packets. Then, each AP uses network encoding to combine received packets from primary and secondary receivers. These linearly combined packets are transmitted to the Controller along the encode vector of each combination. This allows to linearly combine packets from two different neighboring cells and transmitted to the Controller using a wireless backhaul. Some of these combinations may consist of single elements or multiple elements. At the Controller, a joint iterative decoder is used to decode packets from both AP1 and AP2.

FIGS. 10 and 11 illustrate the concept of rateless codes encoding. This concept is known in the art. Thus, the description herein is intended to supplement that known in the art. A group of symbols form information symbols that are attached with CRC bits to form a packet. This packet is encoded to generate a stream of symbols. If there are K information symbols then N symbols are generated by the encoder where N>K. N-K indicates the amount of redundancy added by the encoding process and K/N is the coding rate. Rateless codes could have a very large N.

All N symbols are transmitted and K info symbols can be reconstructed at the Receiver from any K out of N transmission symbols regardless of order in which they were received.

Rateless codes encoding uses K information symbols to generate an infinite number of encoded symbols. Thus, no coding rate. However, any K+A symbols are needed at the receiver to reconstruct the original K symbols and A<<K.

FIG. 12 (A block diagram of MPWU using a CDMA transmitter) depicts a preferred embodiment wherein a MPWU transmitter block diagram provides a CDMA link between APs and a user. One of the various types of traffic data that needs to be transmitted by the MPWU is provided to the Data Processor. The data is divided into source blocks by the Data Processor and then each block is provided to the rateless codes encoder at a time.

The rateless codes encoder generates a set of encoded symbols are de-muxed into M data streams, illustratively two data streams i.e. M=2, each of which is further encoded using a Channel Code Encoder (e.g. Convolution encoder). This version of rateless codes encoder can generate as many symbols as required per data stream. The number of symbols per data stream may not be same. Then, each symbol is convolution encoded, grouped together and provided to an interleaver unit. The output of the interleaver unit is further modulated (i.e. symbol mapping) based on one or more modulation schemes. The number of data streams M, the number of rateless coded symbols per data stream, data rate, channel coding rate, interleaving, and type of symbol mapping are determined by control signals provided by the controller (or a scheduler within the controller) via feedback link. The controller typically assigns values to these factors based on channel conditions, type of data application, quality of service and so on.

This embodiment has distinct advantages over the prior art. Namely, splitting an output of rateless code encoded data into M separate data streams and processing them individually by further channel coding, interleaving, and modulation based on channel conditions, data application, QoS, etc; and simultaneous transmission of each of the data stream to the same or different destination APs. This is similar to downlink broadcasting transmission from base station to multiple subscriber handset. However, in our case a subscriber handset is broadcasting uplink to multiple APs.

Each data stream is then coupled to a code spreader. The spreading codes may be orthogonal codes (e.g. Walsh codes) or orthogonal variable spreading factor (OVSF) codes. The spreading codes may also be codes with pseudo-orthogonal properties (e.g. the Quasi-Orthogonal Functions, QoF), pseudo-random noise sequence (PN-seq) at different chip-offsets, or non-orthogonal codes. A summer combines the outputs of each code spreader. Note that in coherent systems a Pilot signal may be combined to enable coherent detection at the receiver. Also appropriate power gains should be applied (not shown).

In this embodiment, each MPWU admitted into the system has a primary code assigned to it (either by the Controller and/or an AP acting in that capacity). The Controller can dynamically alter or assign these primary codes to various MPWU within a system. For example, Walsh Codes of length C could be used, and each chip of a Walsh sequence corresponds to one symbol of the spreading code. A subset $U=\{C_1, C_2\}$ out of C Walsh Codes could be assigned to a MPWU Similarly, another user uses a different subset $V=\{C_3, C_4\}$ out of the same C Walsh Codes for its data streams and so on.

As is known in the art, if $G_1$ is the primary code, the additional codes $G_i$, will be derived from $G_1$ by $G_i = G_1 * D_i$, where $D_i$ is orthogonal to $D_j$, i not being equal to j. Then, $G_i$ is orthogonal to $G_j$, i not being equal to j.

With this in mind, another preferred embodiment comprises using these primary codes, multiple orthogonal codes (or pseudo-orthogonal codes) could be derived. The primary codes assigned to a MPWU may or may not be perfectly orthogonal to another primary code. However, derived multiple codes should be made orthogonal (or almost so). OVSF and QoF are examples of such derived codes used as the code-spreader. This allows identifying a specific data stream transmitted by a specific MPWU at the receiver of an AP. The orthogonality is maintained at the receiver since the propagation variations on each code are the same.

By using any one type of code(s) (or a combination) mentioned above, code-spreading the data streams should achieve the following objectives: 1. The orthogonality between each stream is maintained to reduce or completely avoid self-interference; 2. Each data stream is uniquely identified from each other; and 3. APs may receive a subset of these data streams. However, knowing the primary code of the MPWU, each AP should be able to recognize which MPWU transmitted those data streams.

This embodiment has distinct advantages over the prior art. Namely, each data stream generated (analogous to FIG. 12) is given the following by using code-spreading: a unique identifier, orthogonality, and association to a MPWU for access control.

The output of the summer (analogous to FIG. 12) is processed using conventional schemes. i.e. the data is coded using cover-code in-phase code $A_I$ and quadrature-phase code $A_Q$. Typical cover-code is PN-seq, scrambling sequence or some other sequence that has low-correlation properties. These cover-codes are assigned to an AP or a set of APs. For example, a primary receiver of one AP and the secondary receiver of a neighboring AP could use these cover-codes at their front-end of the receiver to "uncover" the signals from a set of MPWUs.

As shown in FIG. 12, the output of the cover-coding unit is then filtered, multiplied by a gain, digital-to-analog converted (known in the art, not shown in the figure) and then up-converted by modulating with radio frequency signals cos*w (subscript)c*t and sin*w(subscript)c*t respectively. These radio frequency signals are combined and transmitted via antenna. A box in FIG. 12 is used to indicate a typical method used in a CDMA transmitter.

This embodiment has distinct advantages over the prior art. Namely, a set of receivers (primary and secondary) located at APs that neighbor with each other are allowed to receive data streams transmitted by the same MPWU. A primary receiver on one AP uses cover-code in-phase code A (subscript) I and quadrature-phase code A (subscript) Q to "uncover" the signal and then uses C (subscript) 1 to de-spread the first data stream. A secondary receiver on the neighboring AP uses the same cover-code in-phase code A (subscript) I and quadrature-phase code A (subscript) Q to "uncover" the signal. However, uses C (subscript) 2 to de-spread the second data stream.

FIG. 13 depicts a preferred embodiment of a MPWU using a CDM-OFDMA transmitter (CDM-OFDMA link between an AP and a user). The MPWU Data Traffic Structure is analogous to that shown in FIG. 12 for a CDMA transmitter. FIG. 13 shows blocks starting from signal mapping.

Code Spreading and IFFT operation. Types of spreading codes used are same codes used relative to the embodiment depicted in FIG. 12.

However, M copies of the Signal Mapping output are multiplied to M respective symbols of the spreading code C (subscript) 1. The same is performed on the other data stream using spreading code C (subscript) 2. As shown in FIG. 13, the code-spreaded outputs are superimposed on the same set of N sub-carriers by interleaving and performing a N-point inverse Fast Fourier Transform (IFFT). N-point is the dimension of the IFFT and also represents the number of sub-carriers for the OFDM scheme. Other transformations such as Wavelet, DFT (Discrete Fourier Transform) or any other ortho-normal functions may also be used. A cyclic prefix, variable gain for power adjustment, pilot, guard-tones, overhead-channels may be inserted as typically done in OFDM transmissions.

This embodiment presents distinct advantages over the prior art. Namely, each data stream generated is given the following by using code-spreading, IFFT operation: a unique identity, Orthogonality, association to a MPWU for access control, and each AP may "tune" to a certain subband to receive a subset of data streams.

FIG. 14 depicts a preferred embodiment wherein an OFDMA system is utilized. Each data stream is allocated a set of sub-carriers and transmitted simultaneously. In this case, each AP tunes to a specific set of sub-carriers to obtain each data stream. For example, a first AP uses its primary receiver to obtain the first data stream and a second AP uses a secondary receiver to obtain the other data stream.

This embodiment presents distinct advantages over the prior art. Namely, each data stream generated is given: orthogonality by assigning to a subset of sub-carriers within an OFDM scheme, association to a MPWU for access control is provided by assigned subset of sub-carriers, and each AP may "tune" to a certain subband to receive a subset of data streams.

A preferred embodiment of the present invention comprises:

1—Splitting a data stream into multiple streams of encoded symbols generated by erasure resilient codes (ERC) or/and error correction codes (ECC) encoder (preferrably high redundancy ECC such as rateless codes); Each stream consists of plurality of uniquely encoded symbols; Each stream is further processed using techniques such as channel coding, interleaving, repetition, modulation, etc; In some cases, the above encoding may be done in such a way that further channel coding is not required;

2—After further processing, each encoded symbol stream generated from the same encoder can be further processed using:

A—is spread using distinct orthogonal codes such as Walsh Codes (CDMA case);

B—is spread using distinct pseudo-orthogonal codes such as OVSF (CDMA case);

C—is allocated a distinct subset of orthogonal frequencies (may or may not be contiguous); For example, one stream is transmitted using an orthogonal subset of frequencies f (subscript) 1 to f (subscript) k and another stream is transmitted using f (subscript) (k+1) to f (subscript) n, where f (subscript) 1 to f (subscript) n are all orthogonal to each other (OFDM case);

D—is allocated a distinct subband of contiguous frequencies; For example, one stream is transmitted using a subband of frequency f (subscript) (1 to k) and another stream is transmitted using f (subscript) (k+1 to n) (FDMA case);

E—is allocated separate spatial channels where each stream is transmitted using a plurality of transmit antennas using a MIMO technique; For example, one stream is transmitted in direction x and another stream is transmitted in direction y; (SDMA and Multiple Antenna Technology (MIMO) case);

F—is allocated separate time-slots channels; For example, one stream is transmitted using time-slots t (subscript) 1 to t (subscript) k and another stream is transmitted using another time-slot t (subscript) (k+1) to t (subscript) n; (TDMA case)

Or any combinations of the above such as CDM-OFDM or MIMO-OFDM case;

3—The above encoded symbol streams are addressed to different receivers using one or a combination of techniques mentioned in (2) above; These receivers are installed on Access Points that are located at different locations; Within each Access Point there might be multiple receivers that demod/decode data from multiple transmitters simultaneously;

4—After receiving encoded symbol streams from multiple transmit units, each Access Point combines them by using network coding (linear combining) and forwards those symbols to the controller; Notice that multiple Access Points receive data from the same transmitter;

5—Each controller receives network-encoded symbols from multiple access points and decodes them by using network decoding; Then original source symbols are recovered by decoding;

Whereby a preferred embodiment is presented.

A preferred embodiment is depicted in FIG. 15 wherein basic OFDMA receivers are used at each AP. A primary feature comprises the receivers receiving data streams that have been separated (or split by serial to parallel conversion) after being processed by the rateless code encoders. The streams are transmitted in such a way that different APs receive those data streams by using the minimum amount of time-frequency resources.

FIG. 15 shows the basic structure for the OFDMA receiver. Some of the details, such as channel estimation, are not shown to simplify the diagram.

Each MPWU is allowed to use a certain subset of sub-carriers within the channel. Each MPWU further divides each subset of sub-carriers into subsets of sub-carriers (distributed or localized) and maps a specific stream on to a different subset of sub-carriers.

As depicted in FIG. 15, each AP performs a FFT (or partial FFT) on the received sub-carriers to extract each specific data stream. At the receiver, either full-FFT is performed over the whole subset of subcarriers or a partial-FFT could be performed over the subset of subset of sub-carriers.

Various forms of OFDMA could be used such as: DFT-OFDMA whereby data symbols are spread by performing an FFT before being mapped to sub-carriers with either localized and distributed and orthogonal or non-overlapping sub-carriers); or Interleaved-FDMA: This is realized in the time domain. Data symbols are repeated multiple times and users are separated by assigning a different phase shift to each other.

A preferred embodiment is depicted in FIG. 16 wherein CDM-OFDMA receivers are used. FIG. 16 shows the basic structure for the CDM-OFDMA receiver. Some of the details, such as channel estimation, are not shown to simplify the diagram. Each MPWU is allowed to use a certain subset of sub-carriers within the channel. Then each MPWU spreads a specific data stream onto the whole subset of sub-carrier by using a specific spreading code.

As depicted in FIG. 16, each AP performs a FFT on the received subset of sub-carriers and de-spreads by using a spreading code to extract each specific data stream. Different APs extract different data streams by using different spreading codes. i.e. AP1 uses code C (subscript) 1 and AP2 uses code C (subscript) 2 to de-spread the same set of sub-carriers to extract different data streams.

A preferred embodiment of the present invention comprises:

using rateless code encoded (or low-rate coded i.e. high redundancy) information transmitted from one source to multiple receivers located at multiple access points. Each AP using multiple receivers receives a unique representation of the transmitted information;

an efficient communication link between the access points and the controller is provided whereby each AP sends partial information that is received from the same source using network coding, the controller gathers this partial information from each AP and decodes it;

whereby a novel arrangement of multiple receivers using rateless codes and network coding is provided;

further whereby the allocation of spatial, time, frequency and code resources are utilized.

BRIEF DESCRIPTION OF THE DRAWINGS

FIG. 05 depicts a time plot describing time-diversity for subpackets received by AP1 and AP2 from Ua, Ub, Uc, and Ud FIG. 20A depicts a flow diagram of a preferred embodiment of the present invention FIG. 21 depicts a block diagram of a preferred embodiment using multi-code transmission FIG. 22A depicts a block diagram of a preferred embodiment using multi-code transmission FIG. 22B depicts a block diagram of a preferred embodiment using multi-code transmission FIG. 23 depicts a block diagram of a preferred embodiment using multi-code transmission FIG. 27 depicts a block diagram of a preferred embodiment using multi-code transmission

DETAILED DESCRIPTION OF PREFERRED EMBODIMENTS

Figure 1:
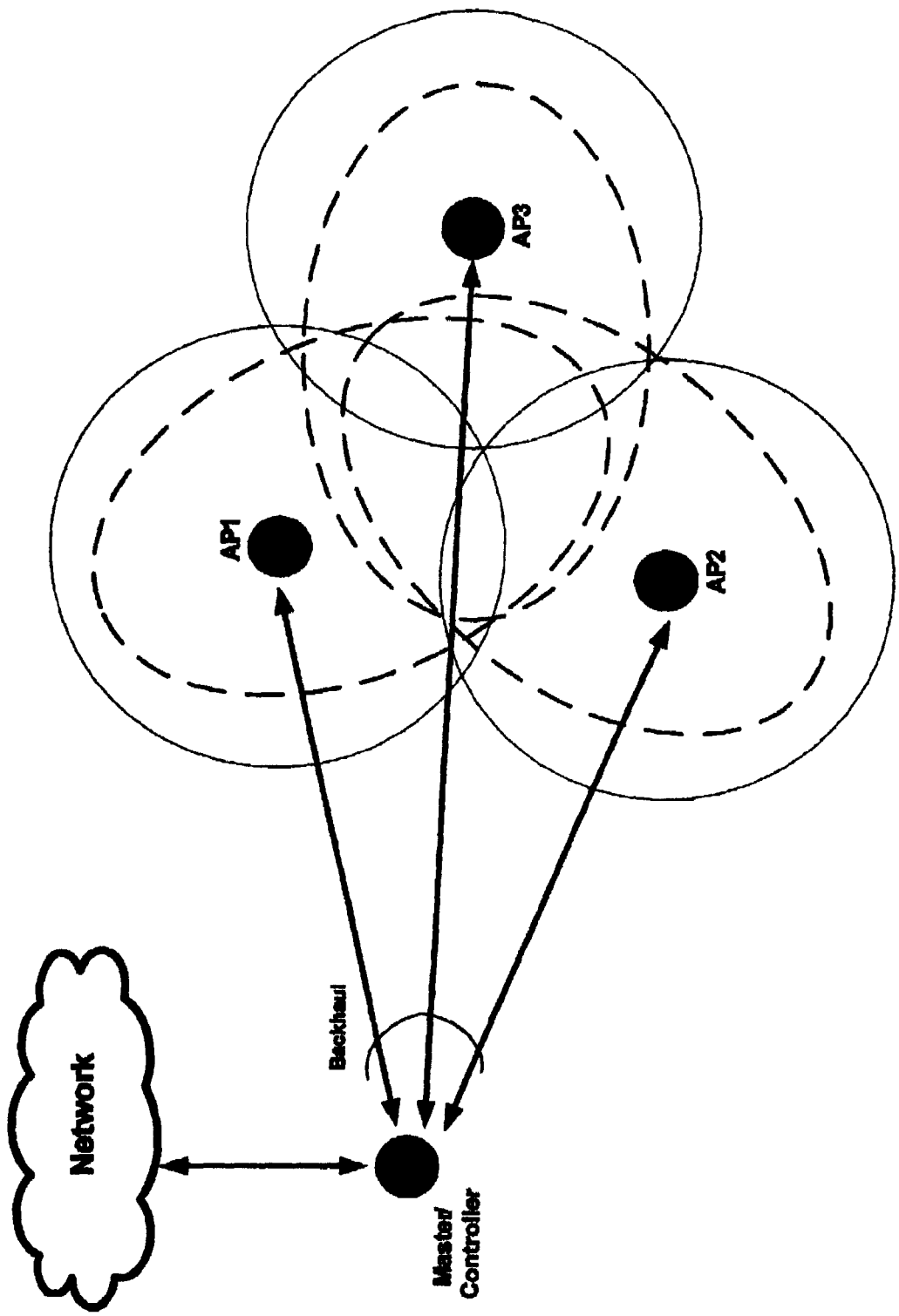
FIG. 01 depicts a block diagram of basic unit of the network topology that consists of a set of Access Points (APs) connected to a Network Controller
Figure 2:
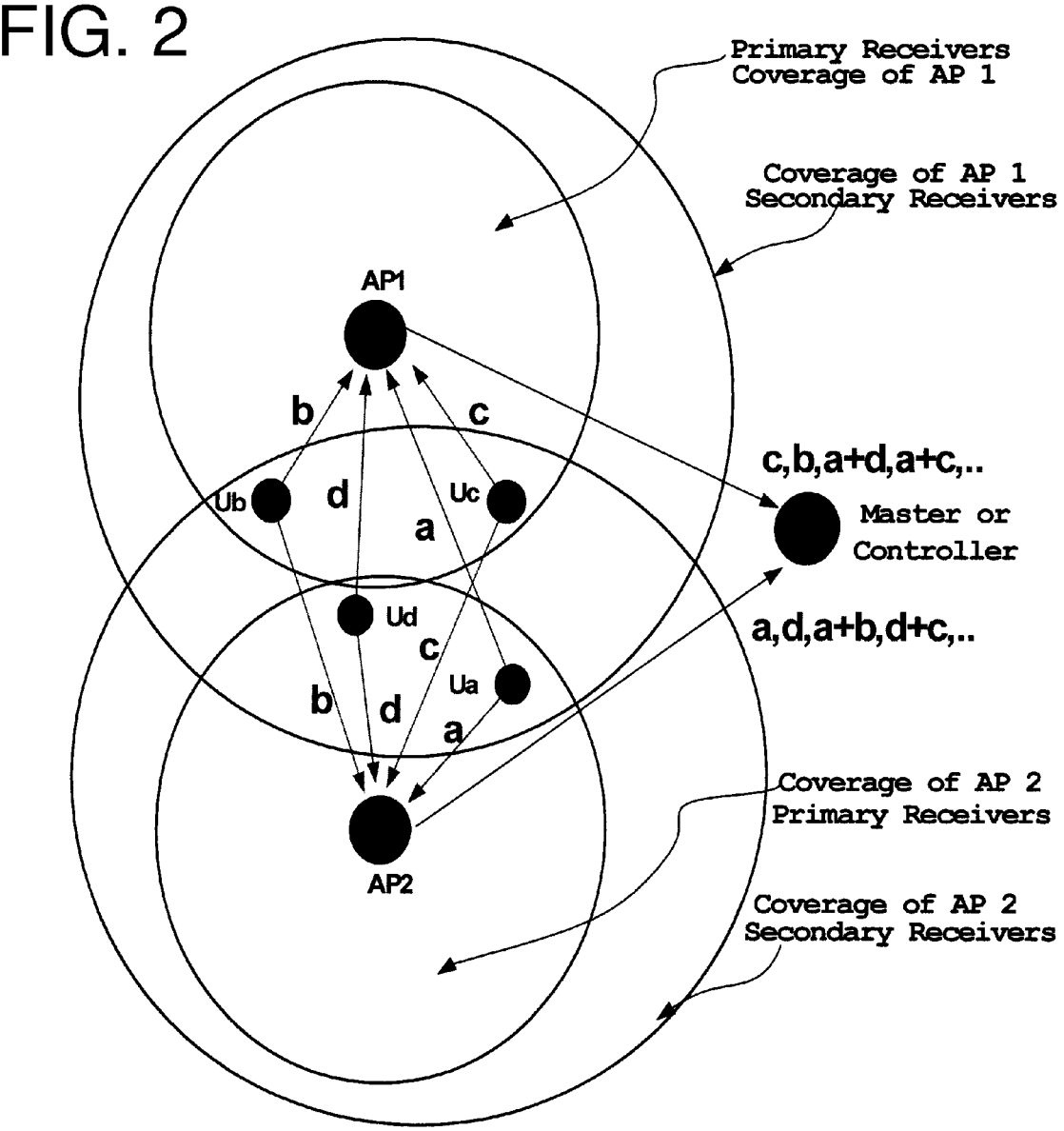
FIG. 02 depicts a block diagram of a preferred embodiment showing access points and communication devices
Figure 3:
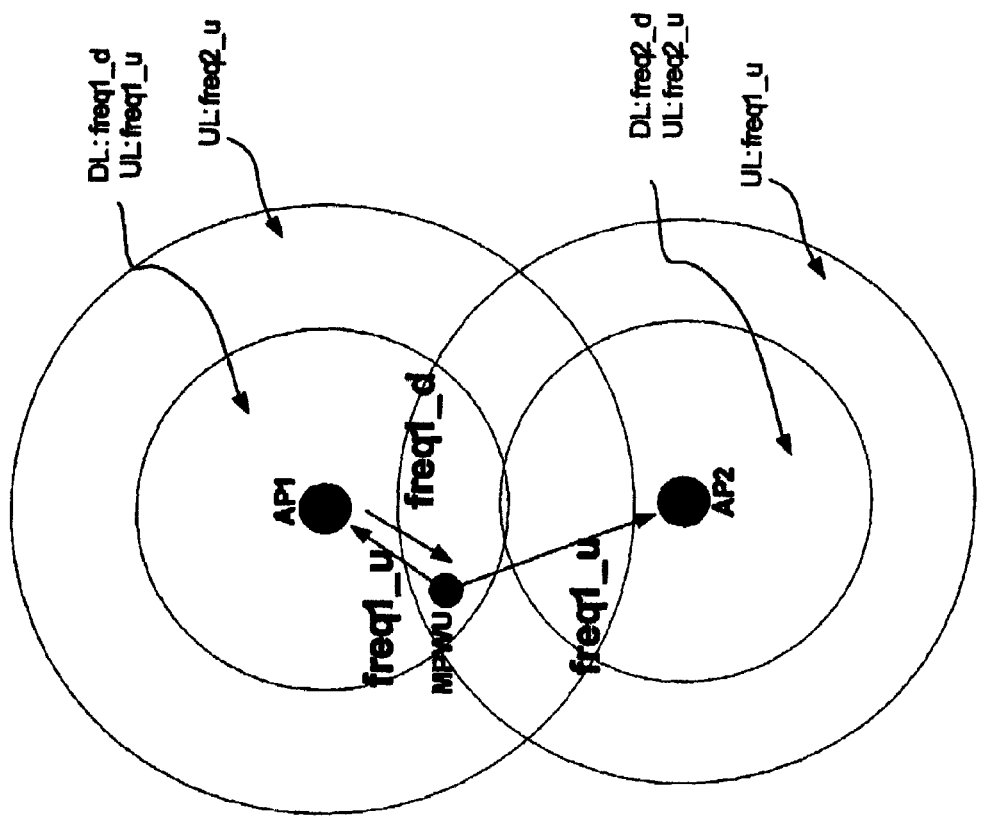
FIG. 03 depicts a block diagram of a preferred embodiment showing TDMA-FDD Implementation
Figure 4:
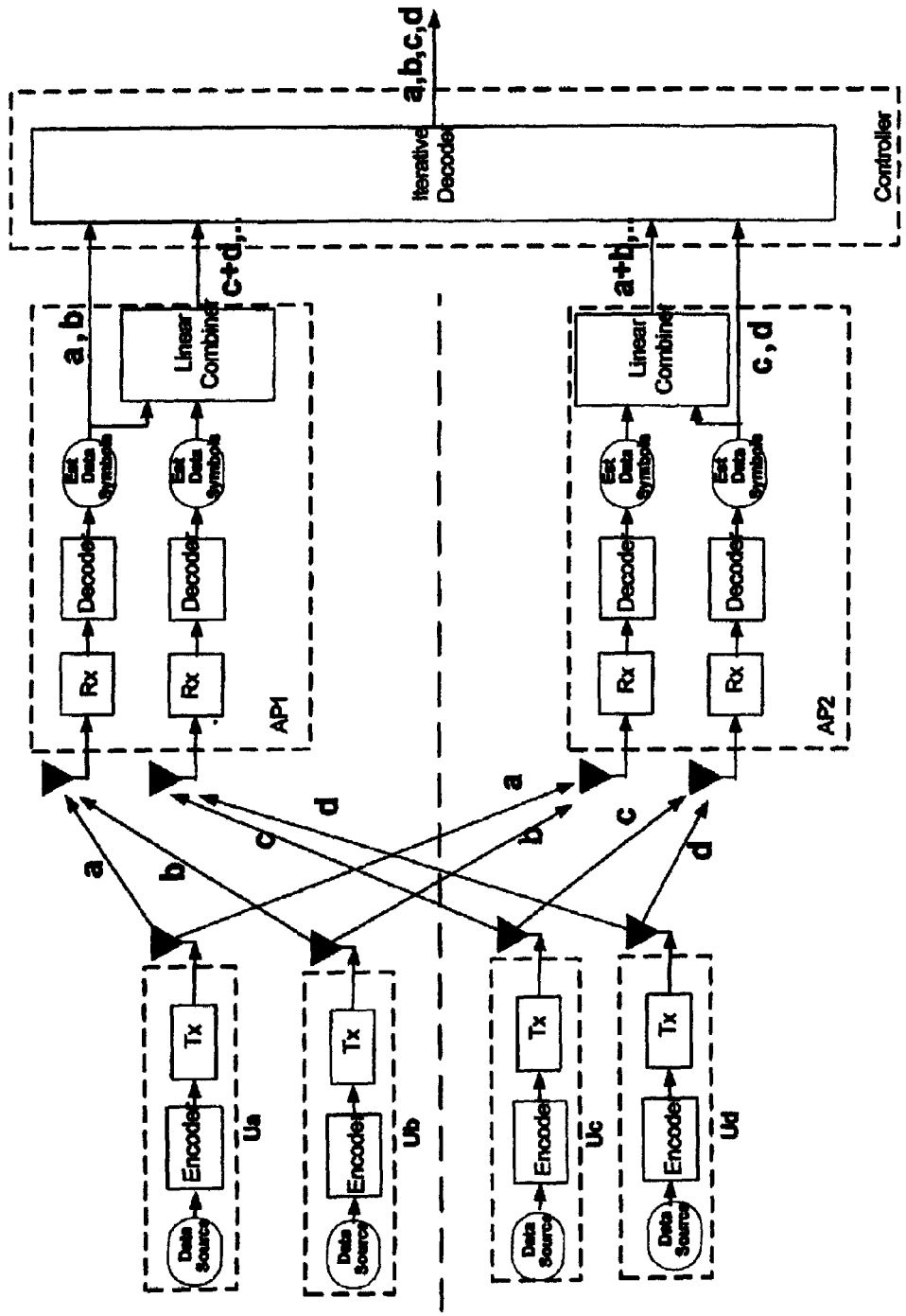
FIG. 04 depicts various functional blocks within a typical Mobile/Portable Wireless Unit (MPWU), AP and the Controller for an implementation.
Figure 6:
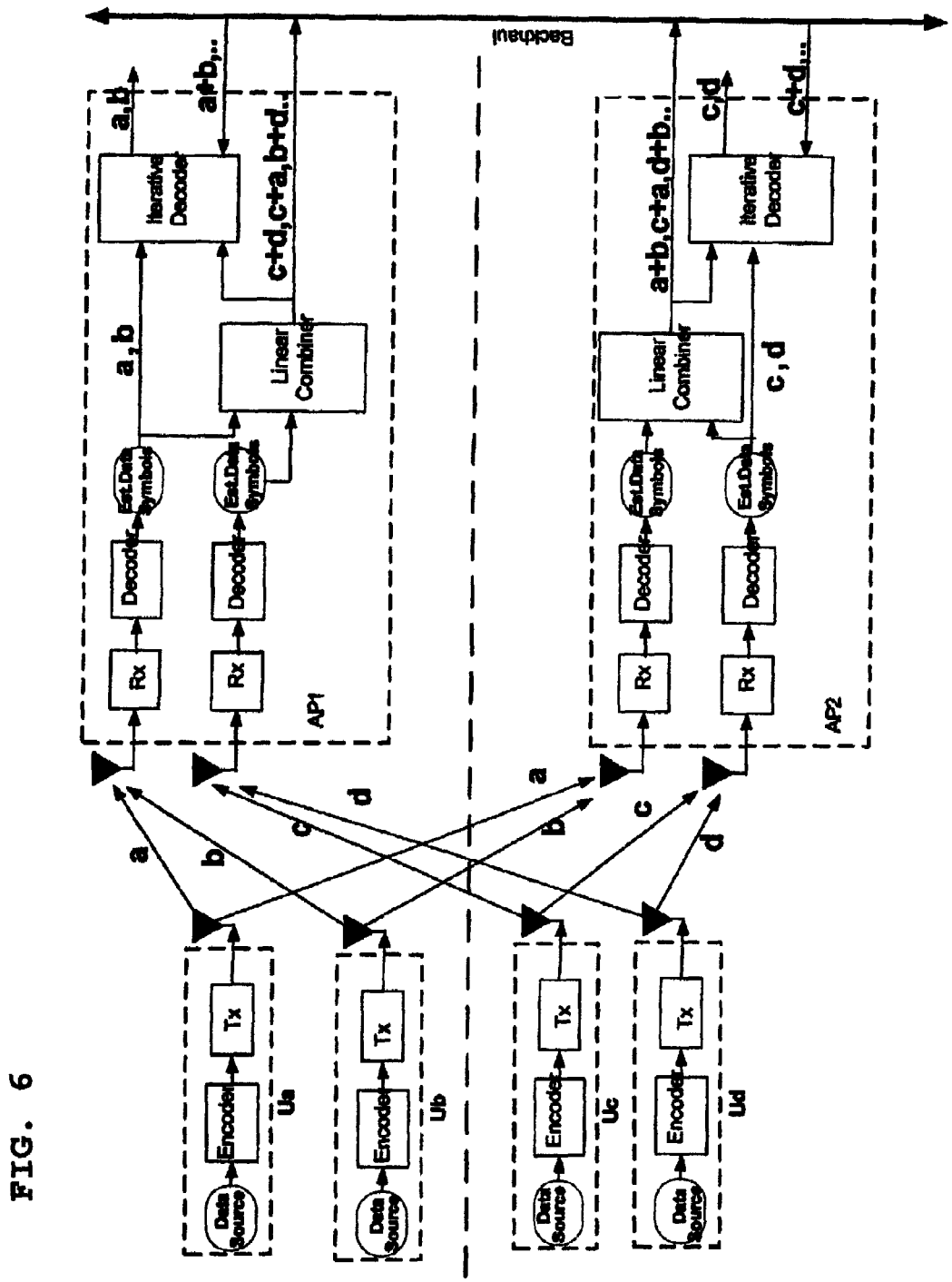
FIG. 06 depicts a MN Architecture where each AP is connected to another via backhaul
Figure 7:
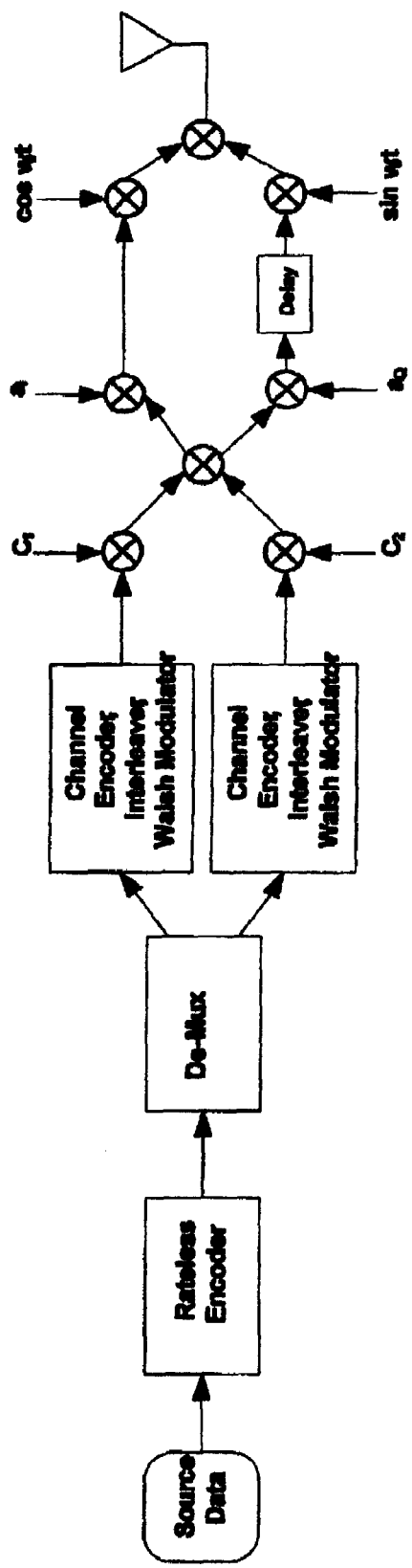
FIG. 07 depicts a block diagram of a preferred embodiment using multi-code transmission
Figure 8:
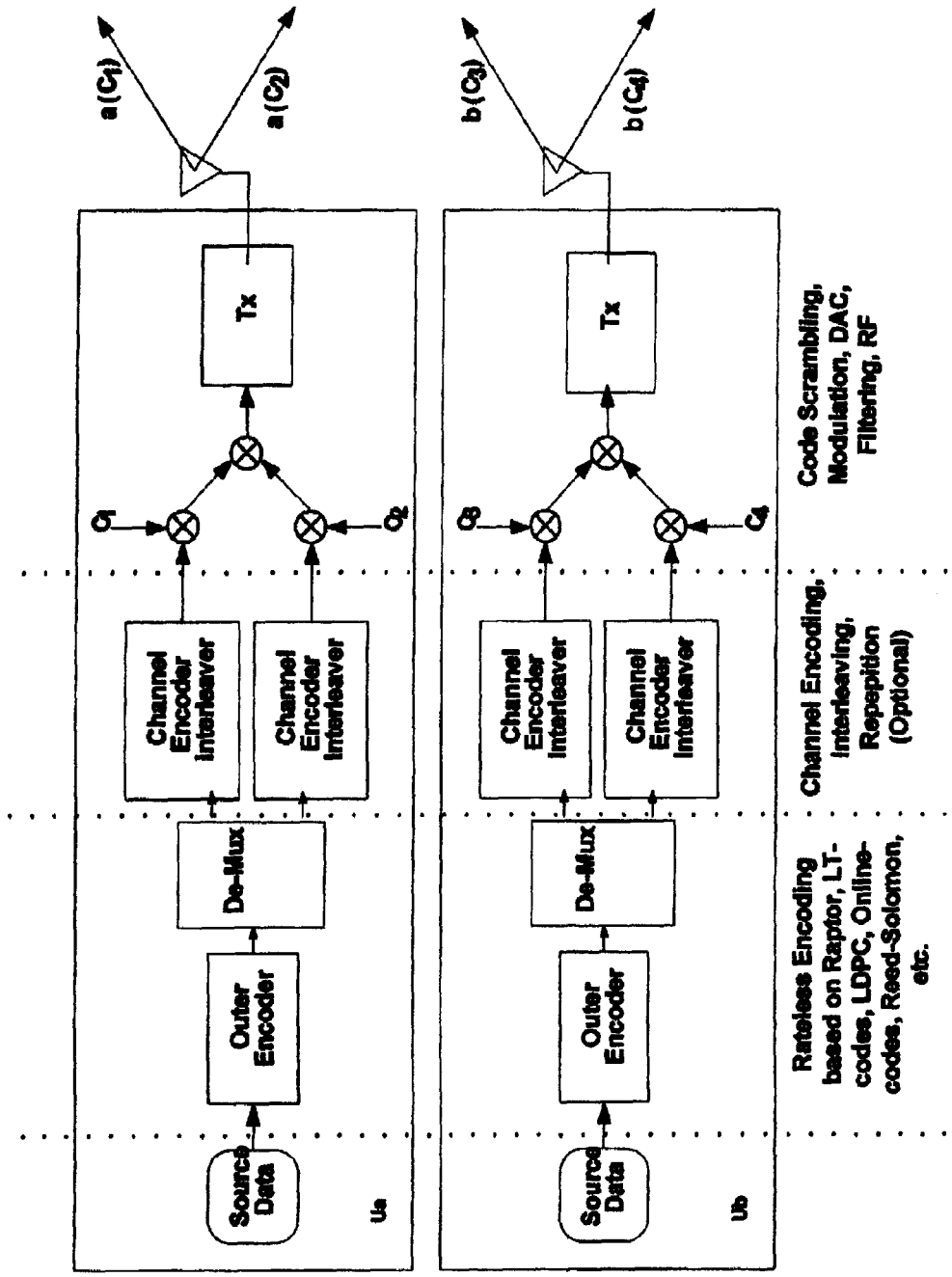
FIG. 08 depicts a block diagram of a preferred embodiment wherein functional blocks of MPWUs Ua and Ub (FIG. 8) that are "associated" with access points AP1 and AP2 respectively
Figure 9:
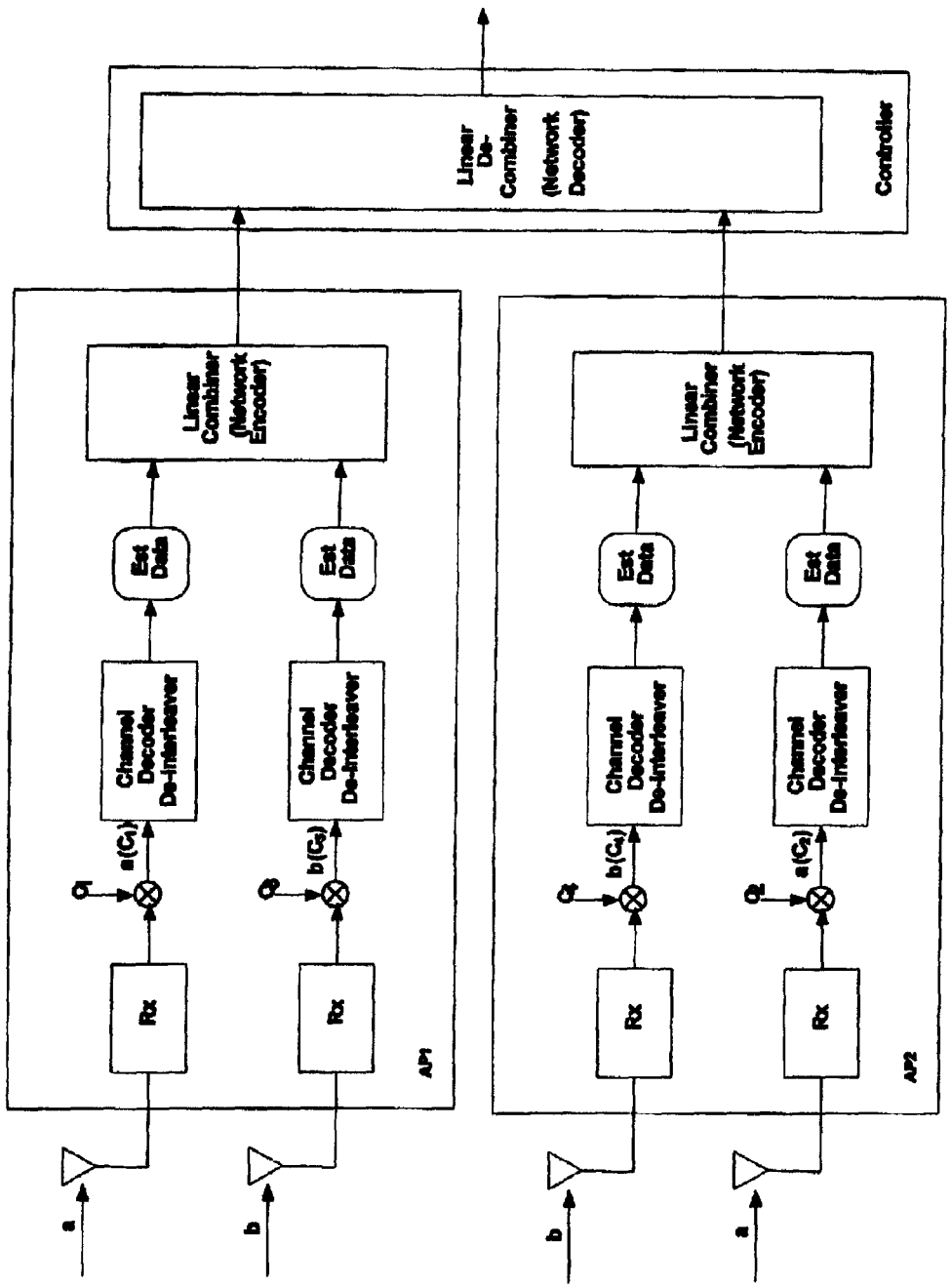
FIG. 09 depicts a block diagram of a preferred embodiment wherein functional blocks of MPWUs Ua and Ub (FIG. 8) that are "associated" with access points AP1 and AP2 respectively
Figure 10:
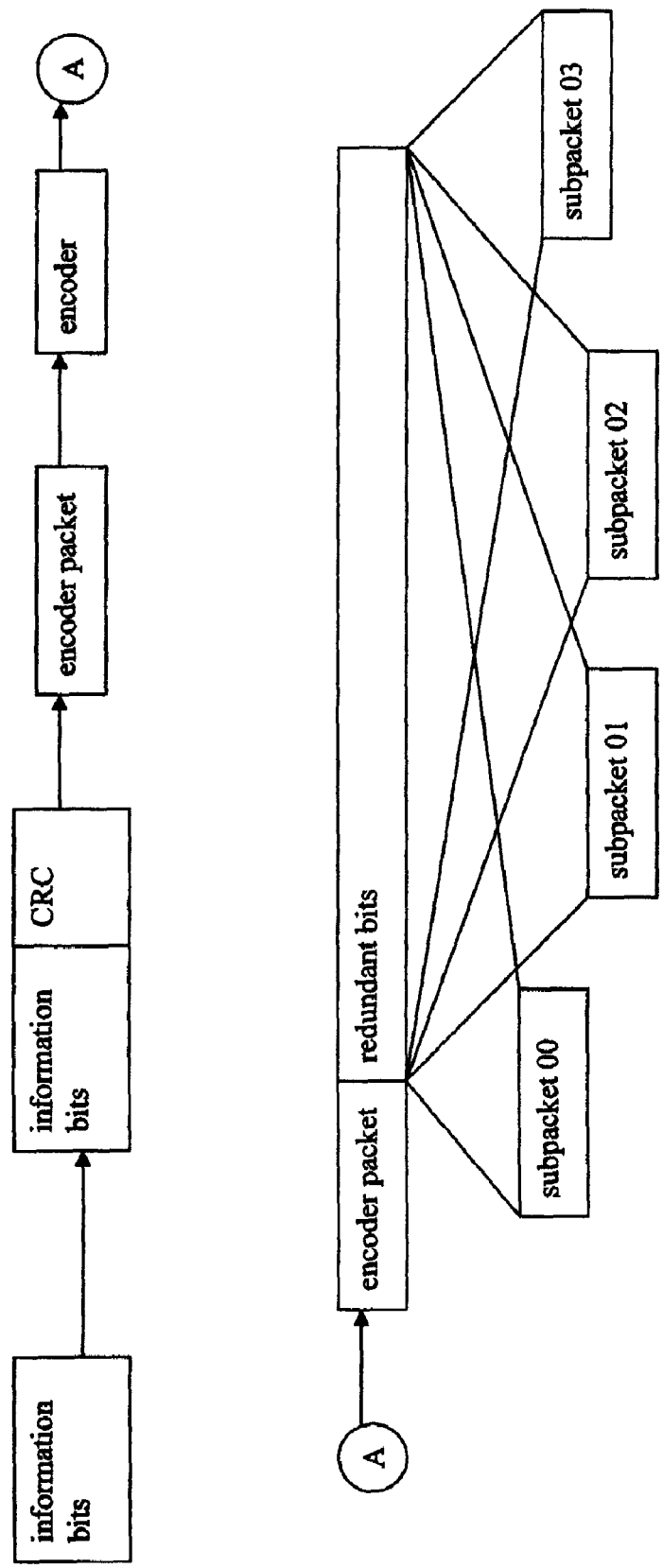
FIG. 10 depicts a visualization of rateless codes encoding
Figure 11:
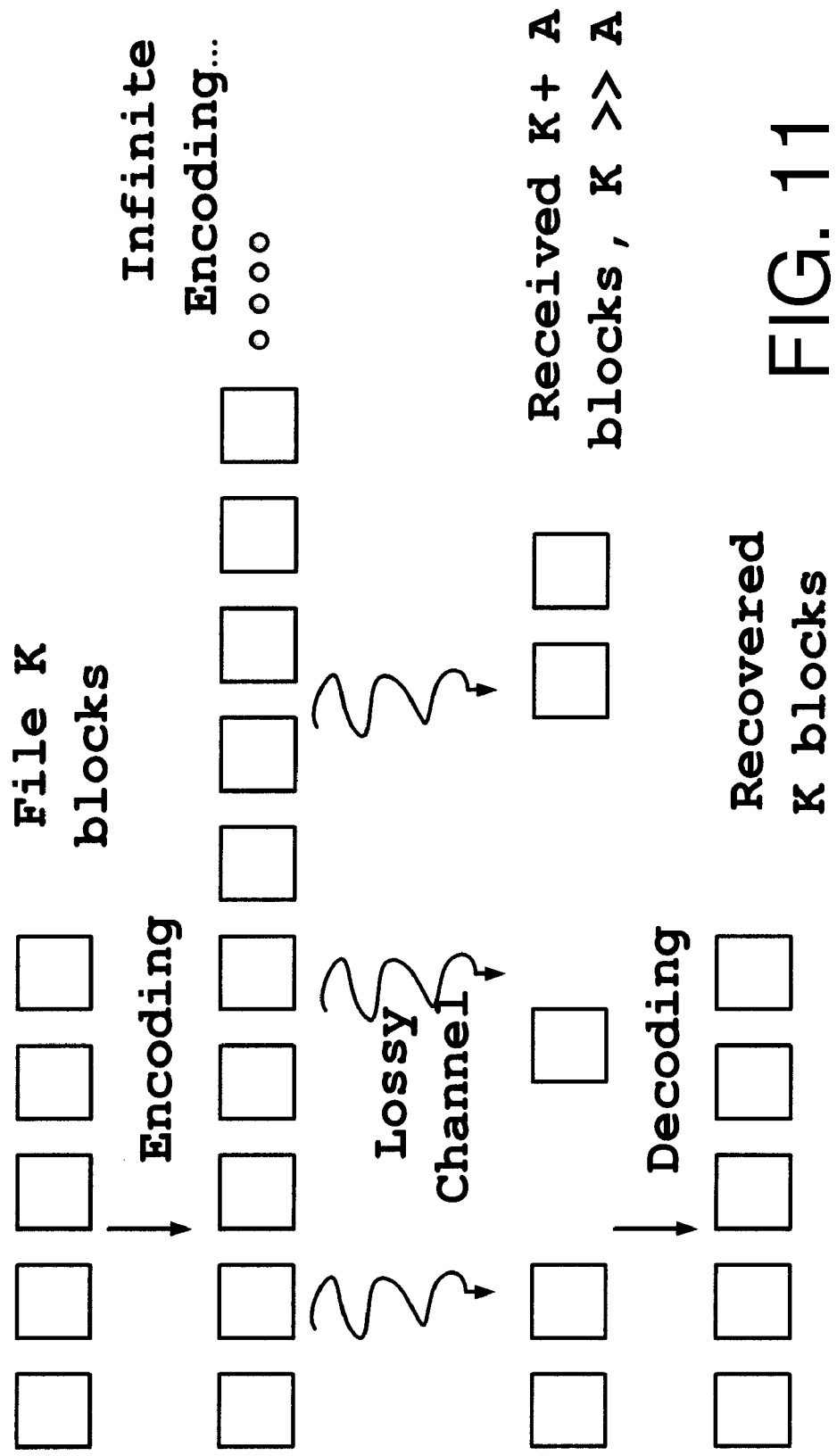
FIG. 11 depicts a visualization of rateless codes encoding
Figure 12:
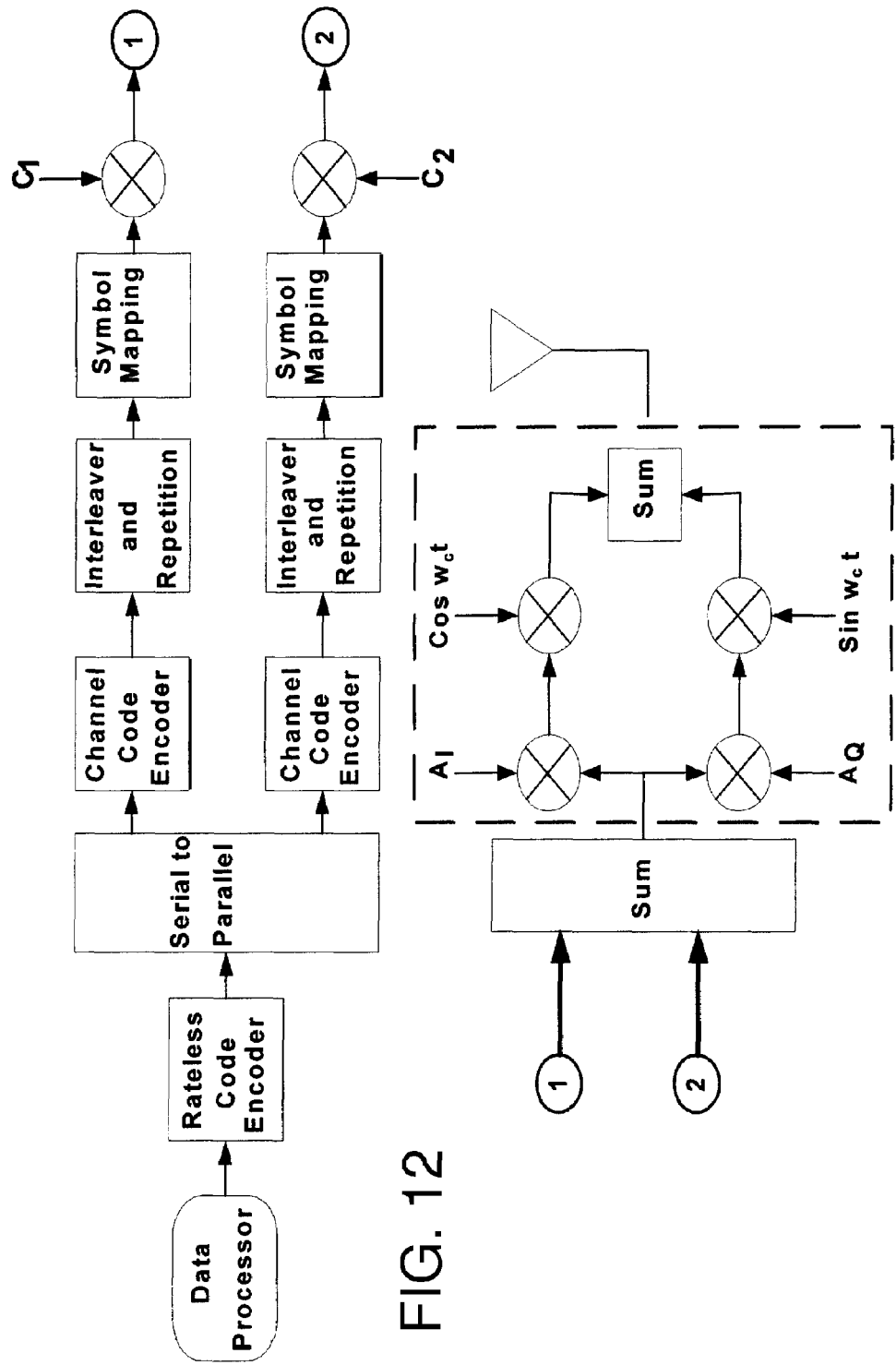
FIG. 12 depicts a block diagram of MPWU using a CDMA transmitter
Figure 13:
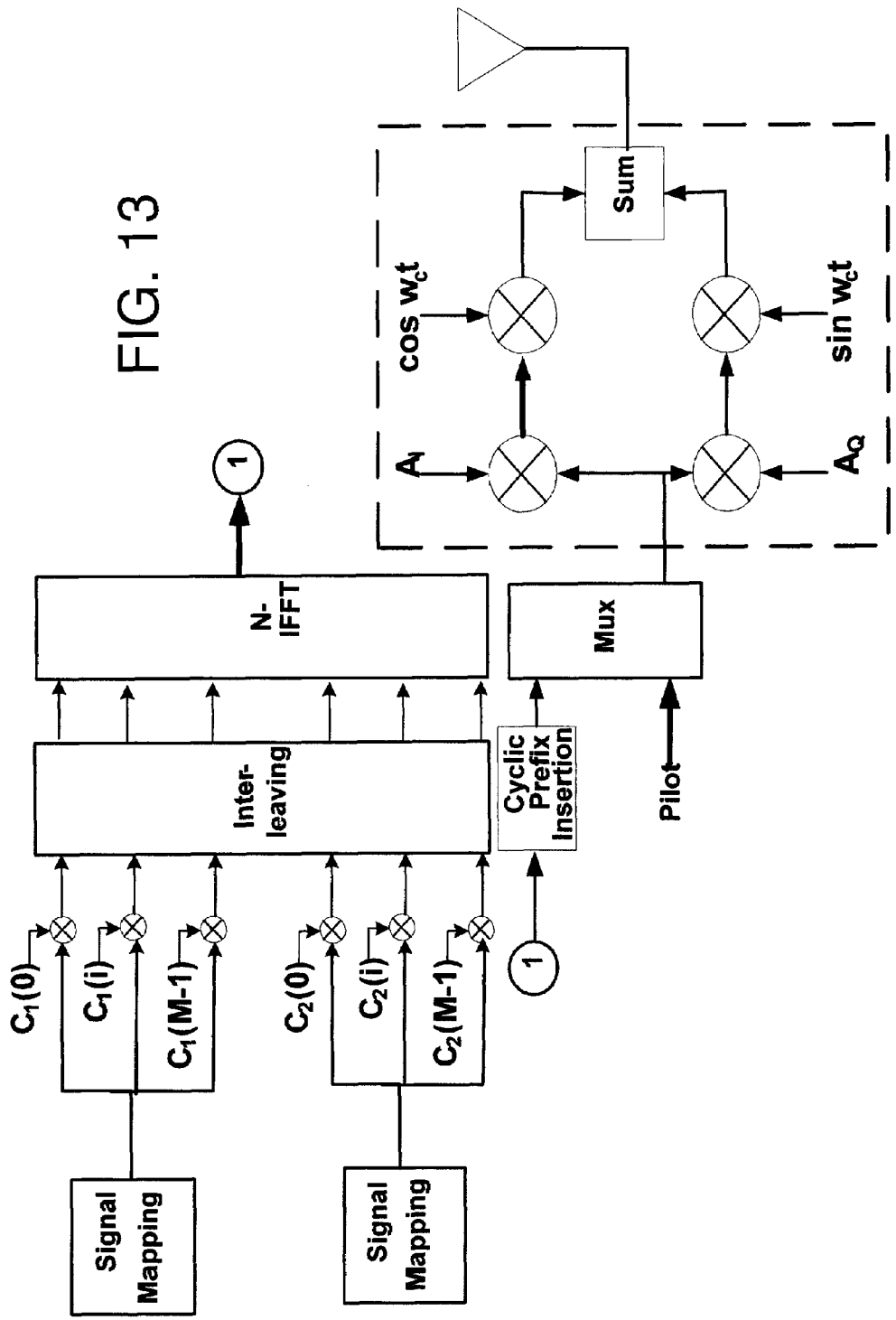
FIG. 13 depicts a block diagram of MPWU using a CDM-OFDMA transmitter
Figure 14:
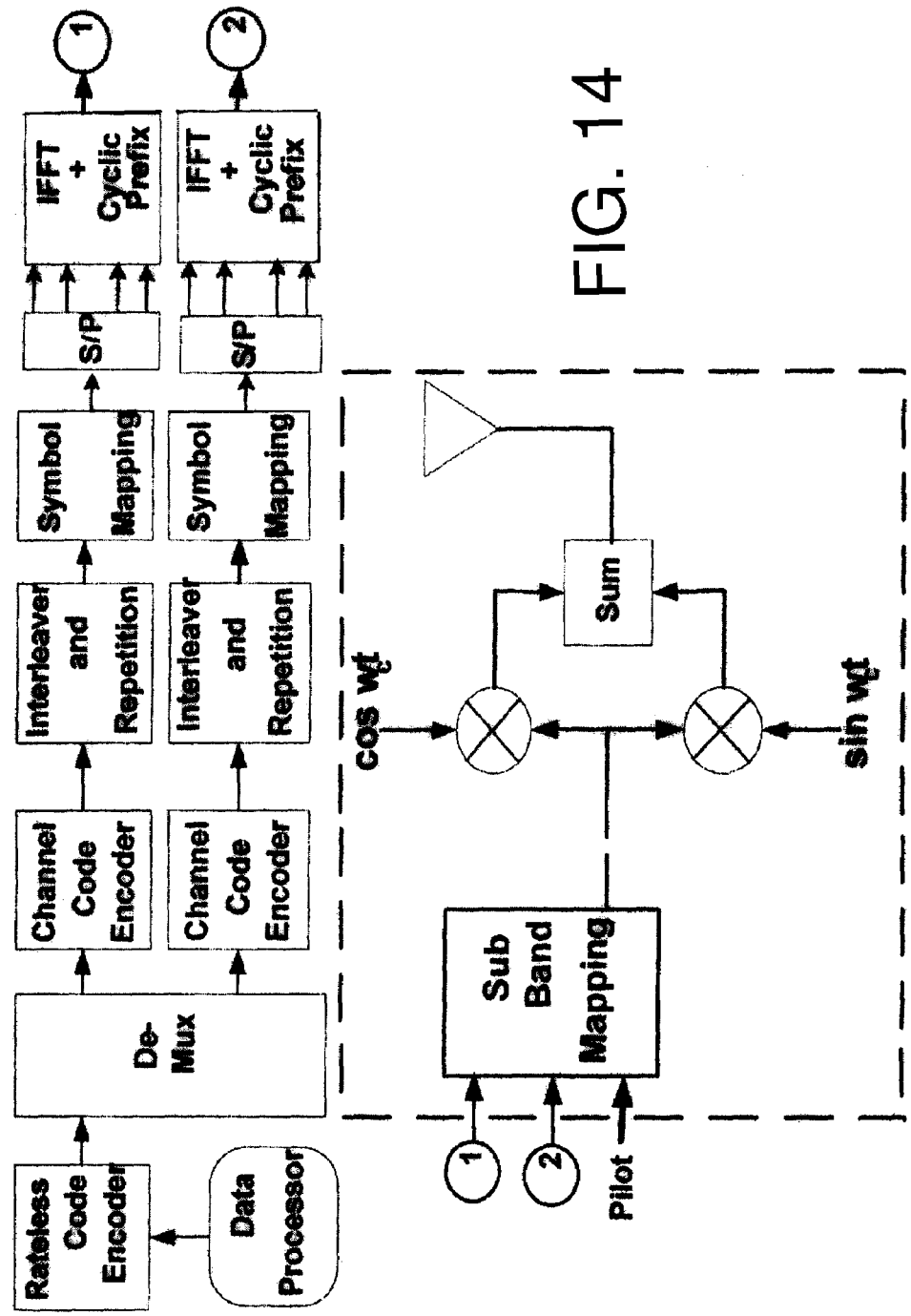
FIG. 14 depicts A block diagram of MPWU using OFDMA transmitter
Figure 15:
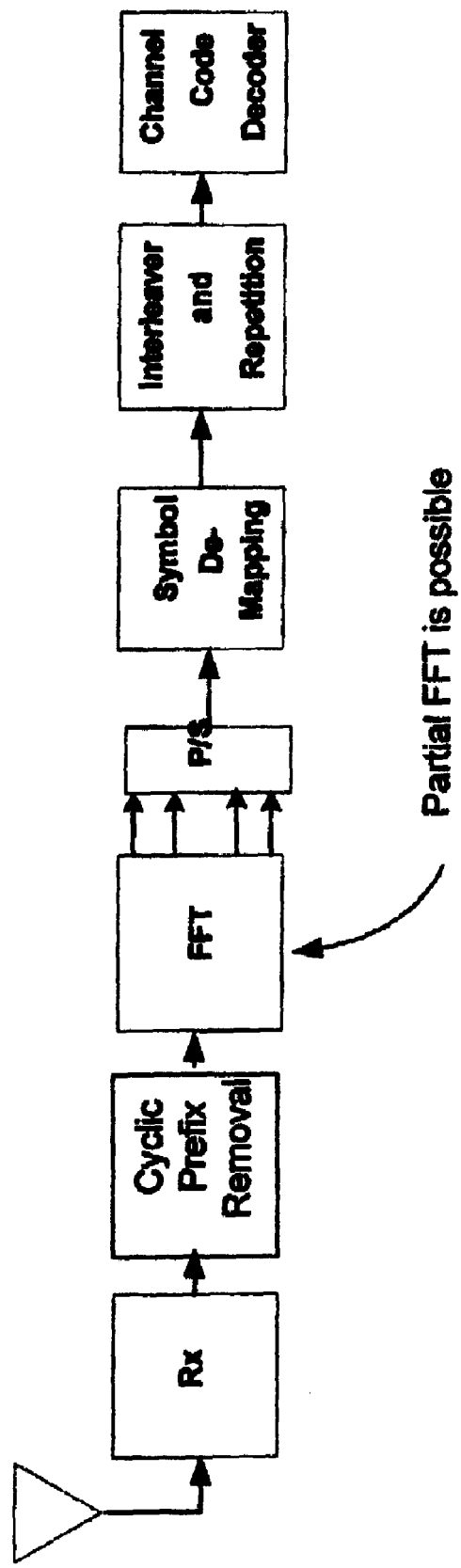
FIG. 15 depicts a basic OFDMA Receiver at each AP
Figure 16:
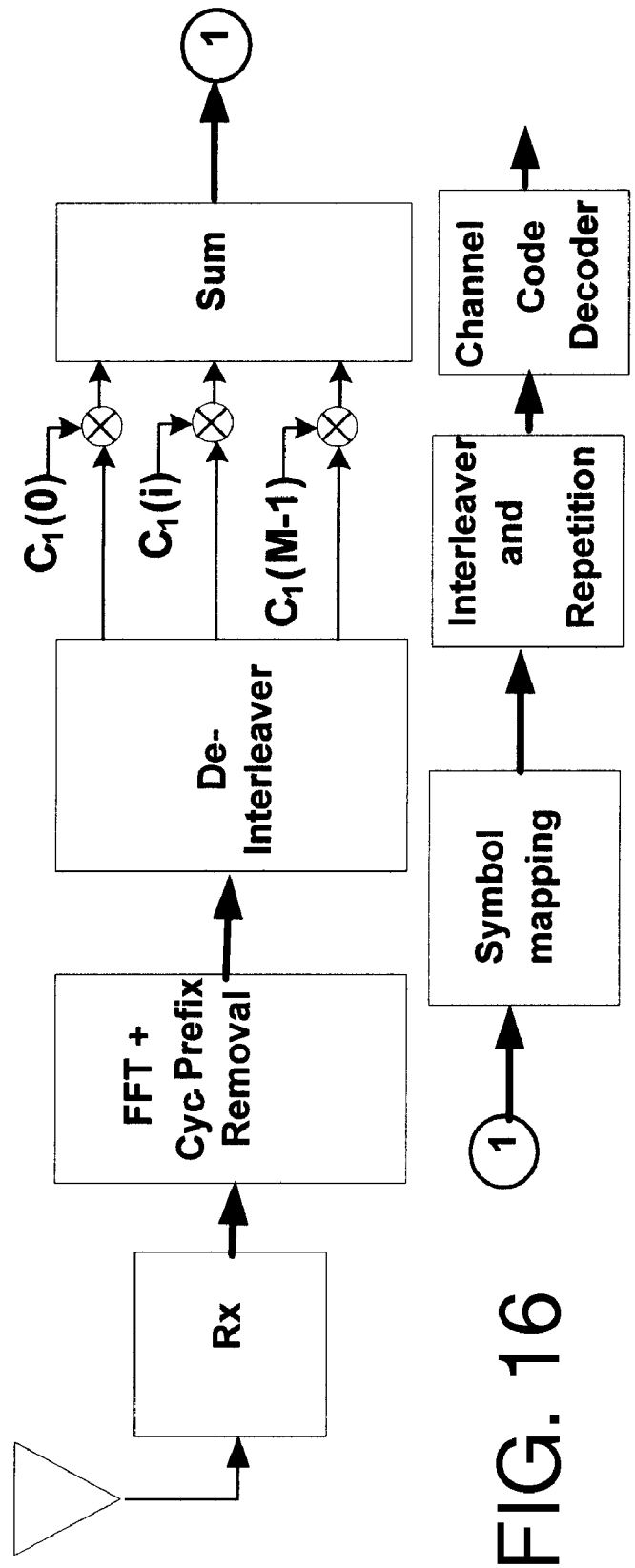
FIG. 16 depicts a basic CDM-OFDMA receiver
Figure 17:
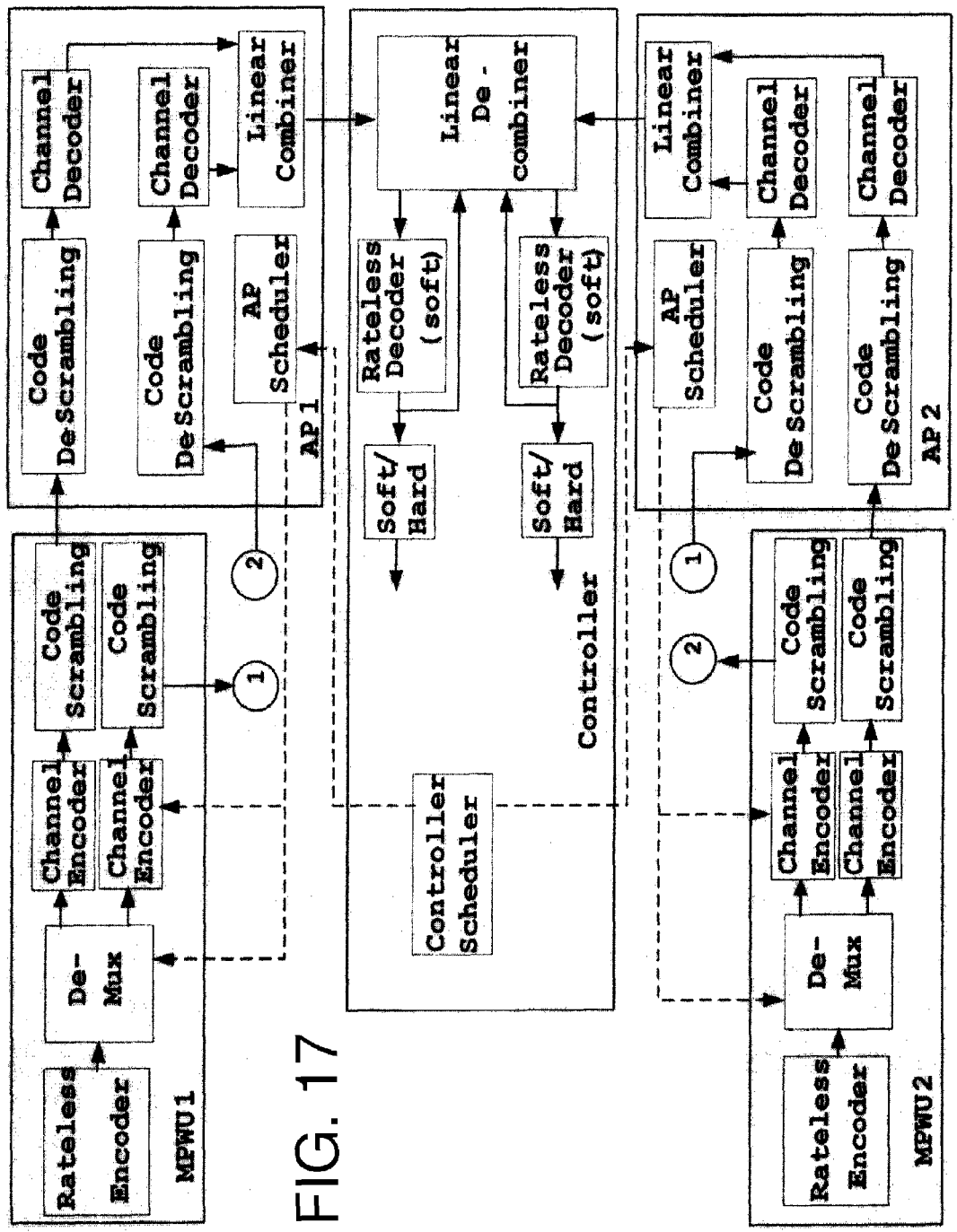
FIG. 17 depicts a block diagram of a preferred embodiment of the present invention
Figure 18:
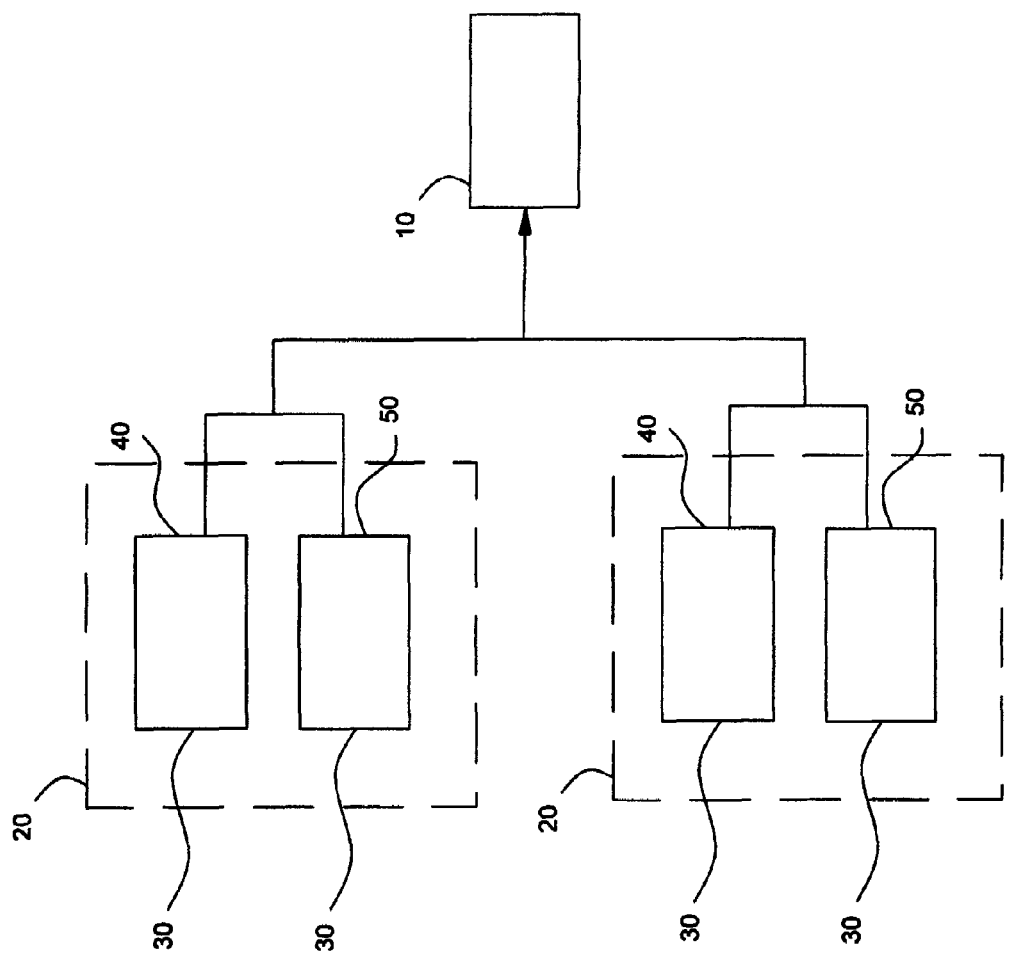
FIG. 18 depicts a block diagram of a preferred embodiment of the present invention
Figure 19:
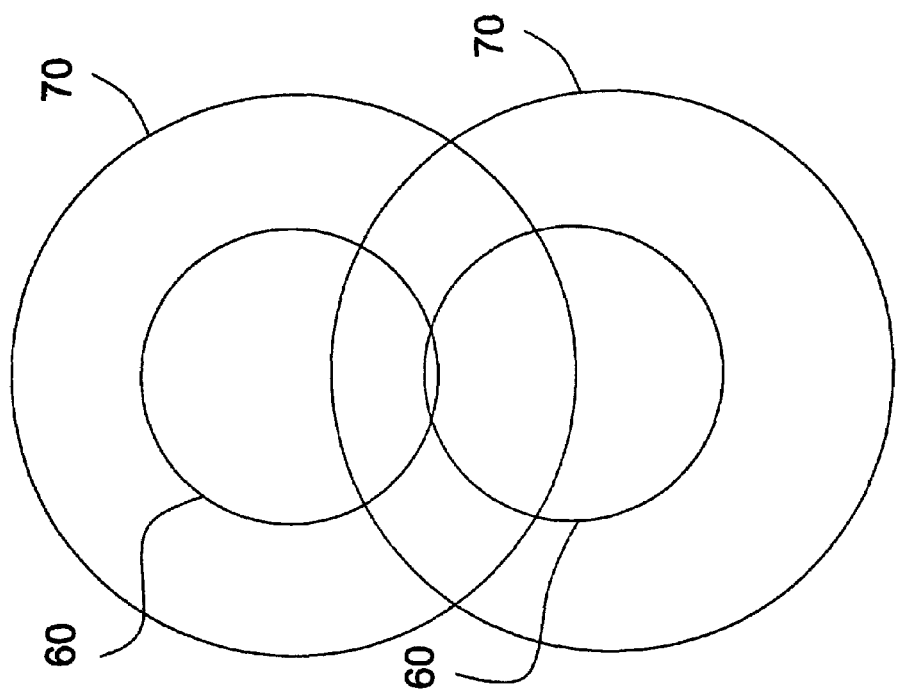
FIG. 19 depicts a block diagram of a preferred embodiment of the present invention
Figure 20B:
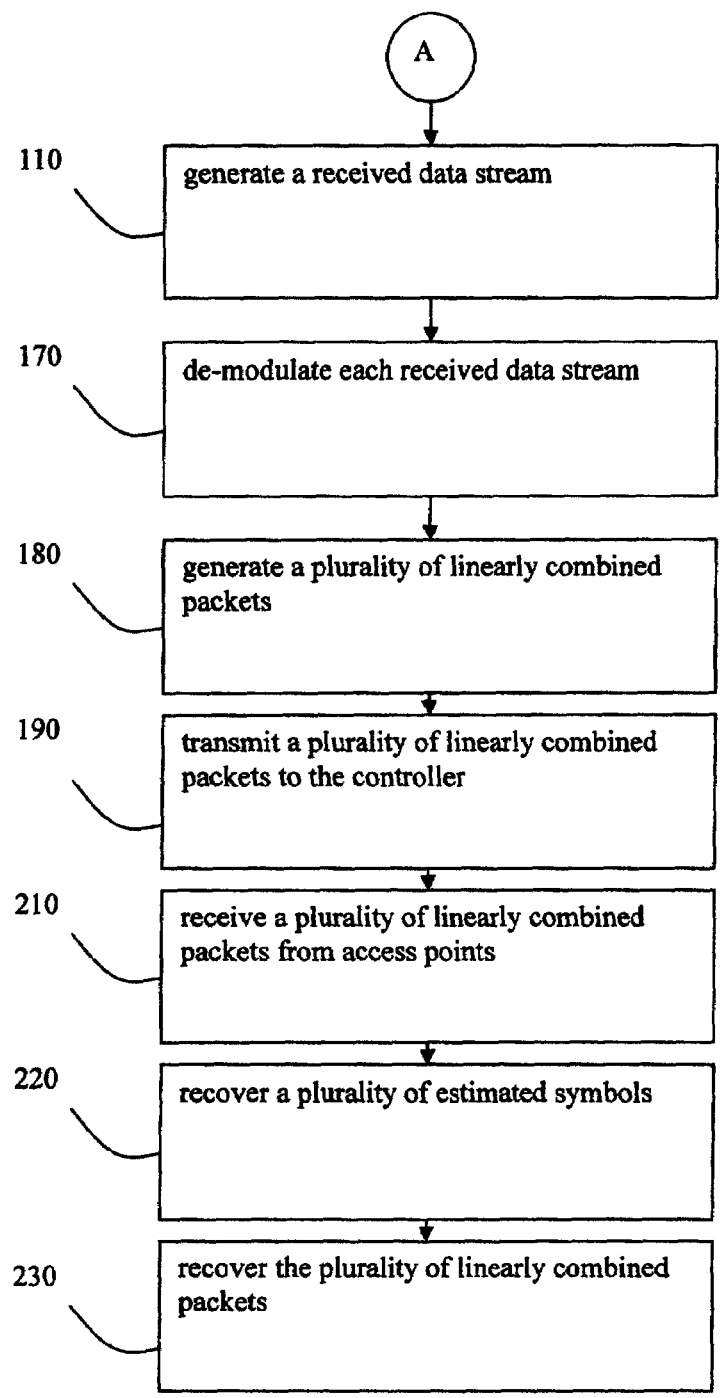
FIG. 20B depicts a flow diagram of a preferred embodiment of the present invention
Figures 24, 24A:
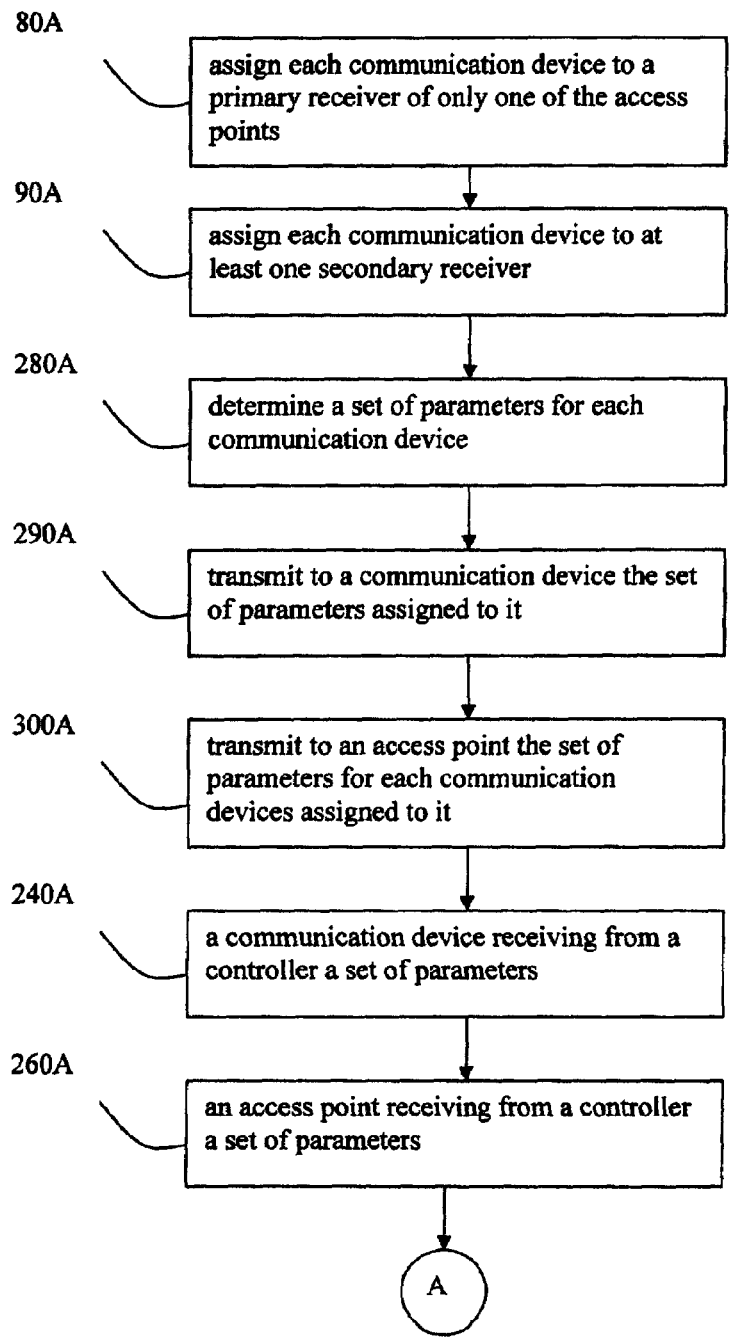
FIG. 24A depicts a flow diagram of a preferred embodiment of the present invention
Figure 24B:
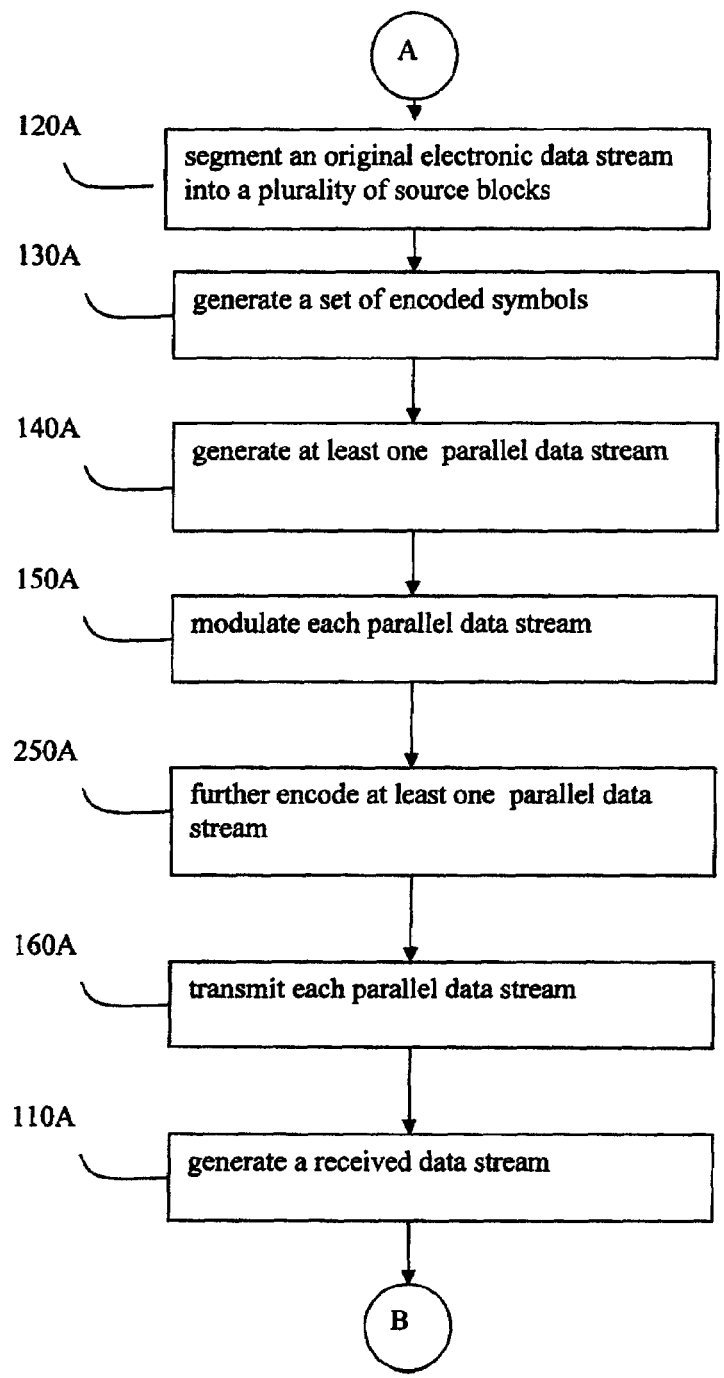
FIG. 24B depicts a flow diagram of a preferred embodiment of the present invention
Figure 24C:
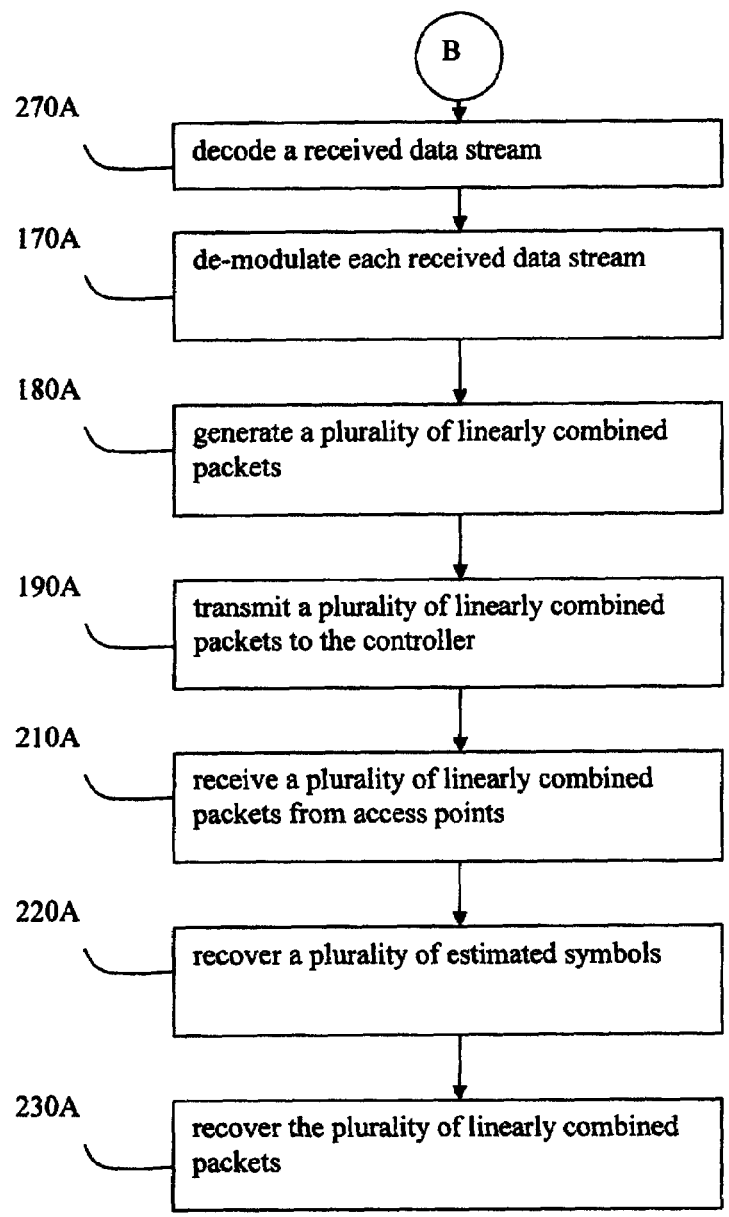
FIG. 24C depicts a flow diagram of a preferred embodiment of the present invention
Figure 25:
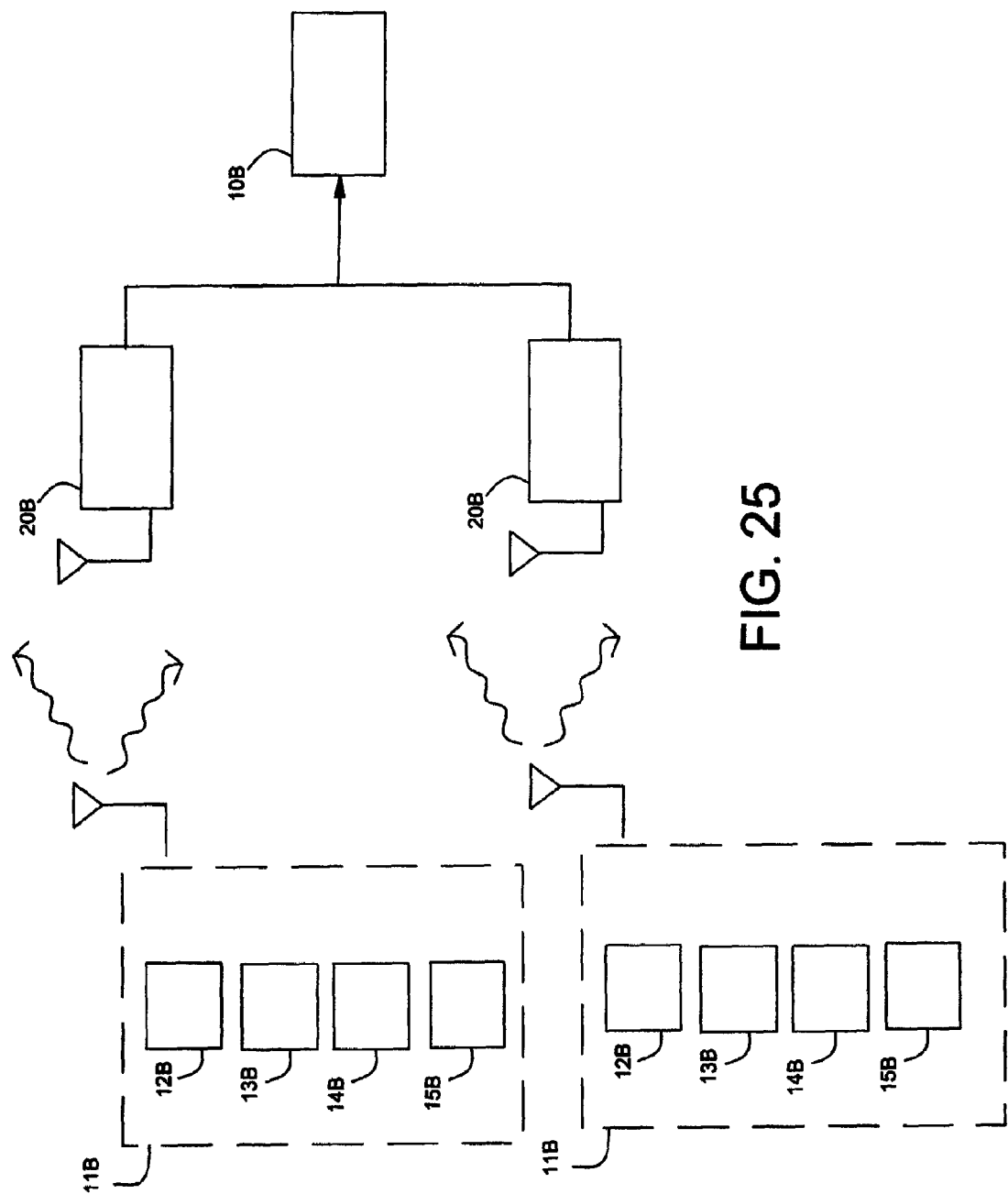
FIG. 25 depicts a block diagram of a preferred embodiment using multi-code transmission
Figure 26A:
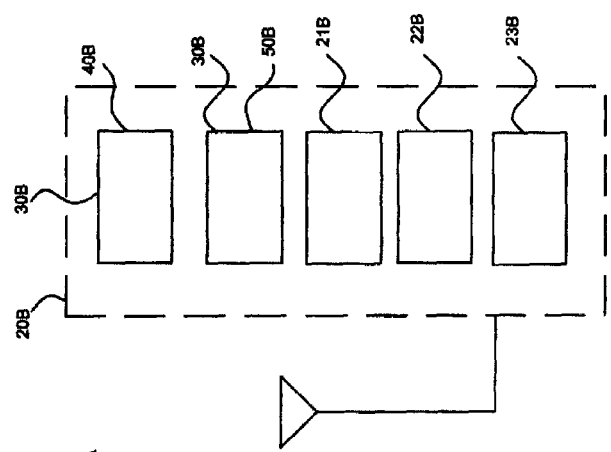
FIG. 26A depicts a block diagram of a preferred embodiment using multi-code transmission
Figure 26B:
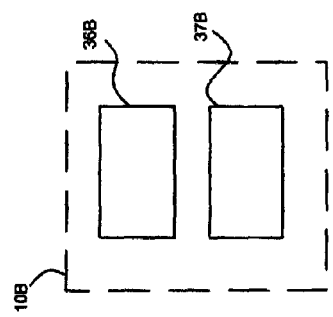
FIG. 26B depicts a block diagram of a preferred embodiment using multi-code transmission
Figure 28A:
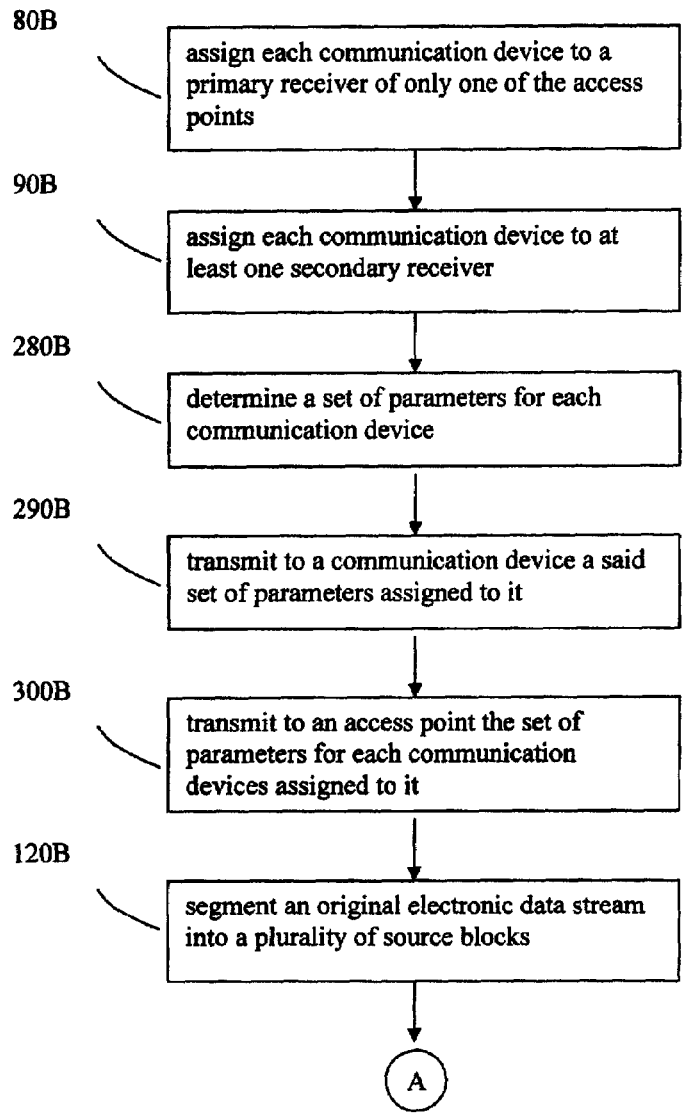
FIG. 28A depicts a flow diagram of a preferred embodiment of the present invention
Figure 28B:
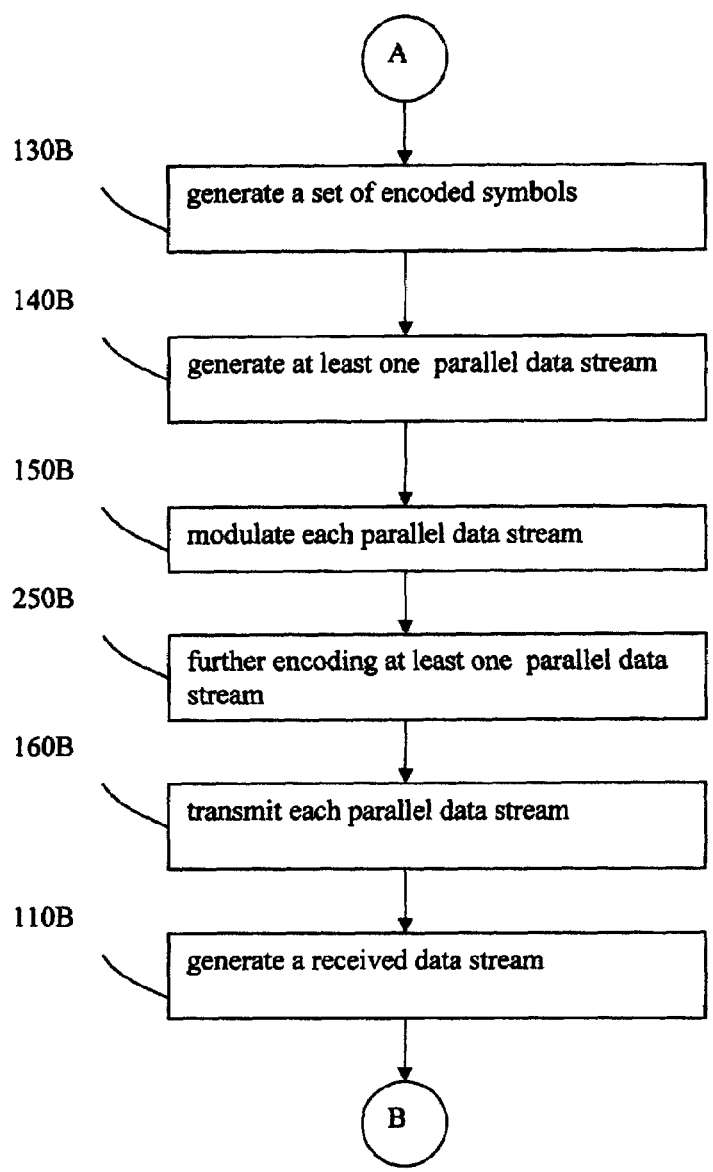
FIG. 28B depicts a flow diagram of a preferred embodiment of the present invention
Figure 28C:
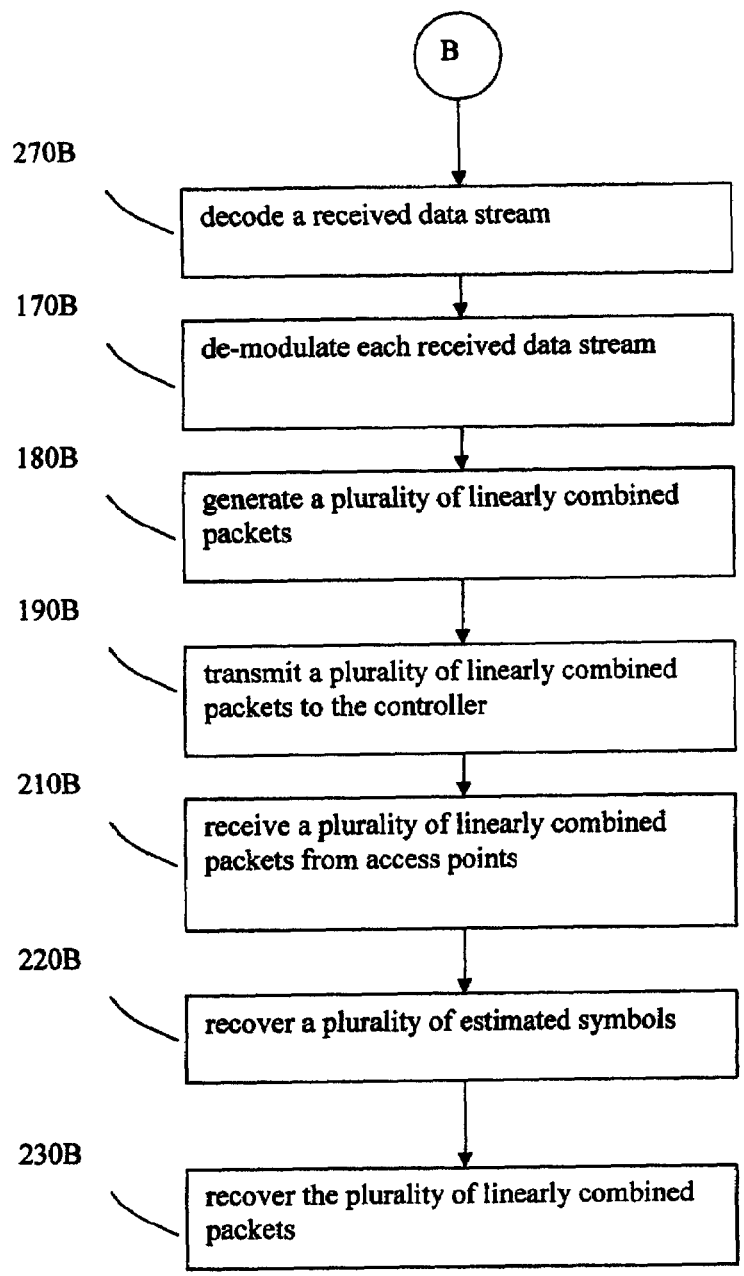
FIG. 28C depicts a flow diagram of a preferred embodiment of the present invention

FIGS. 18 through 20 depict a preferred embodiment of the present invention wherein a method for efficient transmission of electronic information comprises providing a controller 10 being capable of receiving and transmitting electronic information, providing a plurality of access points 20, each access point has a plurality of receivers 30 capable of receiving electronic information, one of the plurality of receivers being designated a primary receiver 40, the rest being designated secondary receivers 50, the primary receiver 40 being tuned to send and receive electronic information to and from a primary cell 60, the secondary receivers 50 being tuned to receive electronic information from at least one designated neighboring cell 70, the controller 10 performing the steps of assigning a communication device to the primary receiver of only one of the access points (Block 80), assigning the communication device to at least one secondary receiver of the access points (Block 90), generating a plurality of estimated symbols by generating a received data stream by any of the receivers receiving through a communications channel at least one parallel data stream from the communication device (Block 110), the at least one parallel data stream being created by the communication device performing the steps of, segmenting an original electronic data stream into a plurality of source blocks (Block 120), the source blocks comprises sequential segments of the original electronic data stream, generating a set of encoded symbols (Block 130) by applying means for low rate code encoding to the plurality of source blocks, generating at least one parallel data stream (Block 140) by performing serial to parallel conversion on the set of encoded symbols, modulating the at least one parallel data stream (Block 150) according to a set of parameters, transmitting the at least one parallel data stream through a communications channel (Block 160), (it is to be understood that the process of serial to parallel conversion generally comprises segmenting a sequential data stream into multiple data streams and simultaneously transmitting the multiple data streams and that the choice of how many parallel data streams to use is a design decision affected by channel conditions and other system conditions, furthermore, this design decision could necessitate having only one data stream and that the one data stream may still be referred to as a parallel data stream, Thus, the term parallel is not to be literally interpreted in some instances), any of the access points performing the steps of, de-modulating the received data stream (Block 170) according to the set of parameters, generating a plurality of linearly combined packets (Block 180) by using network coding to combine one or more of the plurality of estimated symbols, transmitting the plurality of linearly combined packets to the controller (Block 190), the controller performing the steps of, recovering the original electronic data stream of the communication device by, receiving the plurality of linearly combined packets from the access points (Block 210), recovering the plurality of estimated symbols (Block 220) by using network coding to linearly de-combine the plurality of linearly combined packets, recovering the plurality of linearly combined packets (Block 230), using means for low rate code decoding, whereby electronic information may be transmitted in an efficient manner.

Another preferred embodiment comprises: the means for low rate code encoding comprises using rateless codes encoding, the means for low rate code decoding comprises using rateless codes encoding.

Another preferred embodiment comprises: the means for low rate code encoding comprises using erasure resilient codes, the means for low rate code decoding comprises using erasure resilient codes.

FIGS. 21 through 24 depict a preferred embodiment of the present invention wherein, an improved communication system comprises: a plurality of communication devices (As will be apparent to those of skill in the art, a communication device, as used herein, can be a complete device, such as a cellular phone, or a component of a device such as a pmcia card that works in conjunction with a laptop computer, moreover, this term includes not only cell-phones, or pmcia cards but also any wireless device that is attempting to transmit information, for example—a node within a mesh network trying to send data to two Access Points,) 11A, each comprises, a receiver 12A capable of receiving electronic information, a transmitter 13A capable of transmitting electronic information, a computer processor 14A, a computer memory 15A including software instructions that cause the communication device to perform the steps of, segmenting an original electronic data stream into a plurality of source blocks (Block 120A), the source blocks comprises sequential segments of the original electronic data stream, generating a set of encoded symbols (Block 130A) by applying means for low rate code encoding to the plurality of source blocks, receiving from a controller 10A a set of parameters according to a communication scheme (Block 240A), generating at least one parallel data stream (It is understood that if only one data stream is desired that no serial to parallel conversion is necessary) (Block 140A) according to the set of parameters by performing serial to parallel conversion on the set of encoded symbols, modulating the at least one parallel data stream (Block 150A) according to the set of parameters, further encoding the at least one parallel data stream (Block 250A) according to the communication scheme and according to the set of parameters assigned to the communication device, transmitting the at least one parallel data stream (Block 160A), a plurality of access points 20A, each access point has a plurality of receivers 30A capable of receiving electronic information, one of the plurality of receivers being designated a primary receiver 40A, the rest being designated secondary receivers 50A, the primary receiver being tuned to send and receive electronic information to and from a primary cell 60A, the secondary receivers 50A being tuned to receive electronic information from at least one designated neighboring cell 70A, each access point 20A further has, a transmitter 21A capable of transmitting electronic information, a computer processor 22A, a computer memory 23A including software instructions that cause the access point to perform the steps of, generating a plurality of estimated symbols by, receiving from the controller the set of parameters (Block 260A) for each of the plurality of communication devices assigned to the access point, generating a received data stream (Block 110A) by receiving the at least one parallel data stream from any of the plurality of communication devices assigned to the access point, decoding the received data stream (Block 270A) according to the communication scheme and according to the set of parameters assigned to the communication device, de-modulating the received data stream (Block 170A) according to the set of parameters, generating a plurality of linearly combined packets (Block 180A) by using network coding to combine one or more of the plurality of estimated symbols, transmitting the plurality of linearly combined packets to the controller (Block 190A), the controller 10A being capable of receiving and transmitting electronic information to and from each of the plurality of access points, the controller comprises, a computer processor 36A, a computer memory 37A including software instructions that cause the controller to perform the steps of, assigning each of the plurality of communication devices to the primary receiver of only one of the access points 80A, assigning each of the plurality of communication devices to at least one secondary receiver of the access points 90A, determining the set of parameters for each of the communication devices according to the communication scheme (Block 280A), the set of parameters relating to optimizing the communication scheme and being determined according to channel conditions between each of the communication devices and the receivers assigned thereto, the set of parameters comprises determining the number of parallel data streams to be used by each of the communication devices, the set of parameters further comprises determining the modulation order to be used, transmitting to the communication devices the set of parameters assigned thereto (Block 290A), transmitting to the access points the set of parameters for each of the communication devices assigned to each of the access points (Block 300A), recovering the original electronic data stream of the plurality of communication devices by, receiving the plurality of linearly combined packets from the access points (Block 210A), recovering the plurality of estimated symbols by using network coding to linearly de-combine the plurality of linearly combined packets (Block 220A), recovering the plurality of linearly combined packets, using means for low rate code decoding (Block 230A), whereby electronic information may be transmitted in an efficient manner.

Another preferred embodiment comprises: the means for low rate code encoding comprises using rateless codes encoding, the means for low rate code decoding comprises using rateless codes encoding.

Another preferred embodiment comprises: the means for low rate code encoding comprises using erasure resilient codes, the means for low rate code decoding comprises using erasure resilient codes.

Another preferred embodiment comprises: the communication scheme further comprises, the further encoding the at least one parallel data stream according to the communication scheme and according to the set of parameters assigned to the communication device comprises, performing channel code encoding on each of the at least one parallel data stream, the decoding the received data stream according to the communication scheme and according to the set of parameters assigned to the communication device comprises, performing channel code decoding on the received data stream.

Another preferred embodiment comprises: the communication scheme further comprises, the further encoding the at least one parallel data stream according to the communication scheme and according to the set of parameters assigned to the communication device comprises, interleaving each of the at least one parallel data stream, the decoding the received data stream according to the communication scheme and according to the set of parameters assigned to the communication device comprises, de-interleaving the received data stream.

Another preferred embodiment comprises: the communication scheme further comprises, the further encoding the at least one parallel data stream according to the communication scheme and according to the set of parameters assigned to the communication device comprises, allocating to each of the at least one parallel data stream a distinct subset of orthogonal frequencies, the decoding the received data stream according to the communication scheme and according to the set of parameters assigned to the communication device comprises, decoding the received data stream with a distinct subset of orthogonal frequencies.

Another preferred embodiment comprises: the communication scheme further comprises, the further encoding the at least one parallel data stream according to the communication scheme and according to the set of parameters assigned to the communication device comprises, using means for performing distinct code spreading on each of the at least one parallel data stream, performing a summation operation on the at least one parallel data stream, the decoding the received data stream according to the communication scheme and according to the set of parameters assigned to the communication device comprises, using means for performing distinct code de-spreading on each of the received data streams.

Another preferred embodiment comprises: the means for performing distinct code spreading on each of the at least one parallel data stream comprises, using orthogonal codes, the means for performing distinct code de-spreading on each of the received data streams comprises, using orthogonal codes.

Another preferred embodiment comprises: the means for performing distinct code spreading on each of the at least one parallel data stream comprises, using Walsh codes, the means for performing distinct code de-spreading on each of the received data streams comprises, using Walsh codes.

Another preferred embodiment comprises: the means for performing distinct code spreading on each of the at least one parallel data stream comprises, using pseudo-orthogonal codes, the means for performing distinct code de-spreading on each of the received data streams comprises, using pseudo-orthogonal codes.

Another preferred embodiment comprises: the means for performing distinct code spreading on each of the at least one parallel data stream comprises, using OVSF codes, the means for performing distinct code de-spreading on each of the received data streams comprises, using OVSF codes.

Another preferred embodiment comprises: the communication scheme further comprises, the further encoding the at least one parallel data stream according to the communication scheme and according to the set of parameters assigned to the communication device comprises, allocating to each of the at least one parallel data stream a distinct subband of contiguous frequencies, the decoding the received data stream according to the communication scheme and according to the set of parameters assigned to the communication device comprises, decoding the received data stream with a distinct sub-band of contiguous frequencies.

Another preferred embodiment comprises: the communication scheme further comprises, the further encoding the at least one parallel data stream according to the communication scheme and according to the set of parameters assigned to the communication device comprises, allocating each of the at least one parallel data stream with a distinct spatial channel wherein each of the at least one parallel data stream is transmitted using a plurality of transmitting antennas using a MIMO technique, the decoding the received data stream according to the communication scheme and according to the set of parameters assigned to the communication device comprises, decoding the received data stream with a distinct spatial channel wherein each of the received data streams is received using a plurality of receiving antennas using a MIMO technique.

Another preferred embodiment comprises: the communication scheme further comprises, the further encoding the at least one parallel data stream according to the communication scheme and according to the set of parameters assigned to the communication device comprises, allocating to each of the at least one parallel data stream a separate time slot to incorporate time division multiple access, the decoding the received data stream according to the communication scheme and according to the set of parameters assigned to the communication device comprises, decoding the received data stream utilizing time division multiple access.

FIGS. 25 through 28 depict a preferred embodiment of the present invention wherein, A method for efficient transmission of electronic information comprises: providing a controller 10B being capable of receiving and transmitting electronic information, providing a plurality of access points 20B, each access point has a plurality of receivers 30B capable of receiving electronic information, one of the plurality of receivers being designated a primary receiver 40B, the rest being designated secondary receivers 50B, the primary receiver being tuned to send and receive electronic information to and from a primary cell 60B, the secondary receivers being tuned to receive electronic information from at least one designated neighboring cell 70B, the controller 10B performing the steps of assigning each of a plurality of communication devices to the primary receiver of only one of the access points 80B, assigning each of the plurality of communication devices to at least one secondary receiver of the access points 90B, determining a set of parameters for each of the plurality of communications devices according to a communication scheme (Block 280B), the set of parameters relating to optimizing the communication scheme and being determined according to channel conditions between each of the communication devices and the receivers assigned thereto, the set of parameters comprises determining the number of parallel data streams to be used by each of the communication devices, the set of parameters further comprises determining the modulation order to be used, transmitting to the communication devices the set of parameters assigned thereto (Block 290B), transmitting to the access points the set of parameters for each of the communication devices assigned to each of the access points (Block 300B), generating a plurality of estimated symbols by, generating a received data stream by any of the receivers receiving through a communications channel the at least one parallel data stream from any of the plurality of communication devices assigned to the access point (Block 10B), the at least one parallel data stream being created by any of the plurality of communication devices performing the steps of, segmenting an original electronic data stream into a plurality of source blocks, the source blocks comprises sequential segments of the original electronic data stream (Block 120B), generating a set of encoded symbols by applying means for low rate code encoding to the plurality of source blocks (Block 130B), generating at least one parallel data stream according to the set of parameters by performing serial to parallel conversion on the set of encoded symbols (Block 140B), modulating the at least one parallel data stream according to the set of parameters (Block 150B), further encoding each of the at least one parallel data stream according to the communication scheme and according to the set of parameters assigned to the communication device (Block 250B), transmitting the at least one parallel data stream through a communications channel (Block 160B), any of the access points performing the steps of, decoding the received data stream according to the communication scheme and according to the set of parameters assigned to the communication device (Block 270B), demodulating the received data stream according to the set of parameters (Block 170B), generating a plurality of linearly combined packets by using network coding to combine one or more of the plurality of estimated symbols (Block 180B), transmitting the plurality of linearly combined packets to the controller (Block 190B), the controller performing the steps of, recovering the original electronic data stream of the plurality of communication devices by, receiving the plurality of linearly combined packets from the access points (Block 210B), recovering the plurality of estimated symbols by using network coding to linearly de-combine the plurality of linearly combined packets (Block 220B), recovering the plurality of linearly combined packets, using means for low rate code decoding (Block 230B), whereby electronic information may be transmitted in an efficient manner.

Another preferred embodiment comprises: the means for low rate code encoding comprises using rateless codes encoding, the means for low rate code decoding comprises using rateless codes encoding.

Another preferred embodiment comprises: the means for low rate code encoding comprises using erasure resilient codes, the means for low rate code decoding comprises using erasure resilient codes.

Another preferred embodiment comprises: the communication scheme further comprises, the further encoding the at least one parallel data stream according to the communication scheme and according to the set of parameters assigned to the communication device comprises, performing channel code encoding on each of the at least one parallel data streams, the decoding the received data stream according to the communication scheme and according to the set of parameters assigned to the communication device comprises, performing channel code decoding on the received data stream.

Another preferred embodiment comprises: the communication scheme further comprises, the further encoding the at least one parallel data stream according to the communication scheme and according to the set of parameters assigned to the communication device comprises, interleaving each of the at least one parallel data stream, the decoding the received data stream according to the communication scheme and according to the set of parameters assigned to the communication device comprises, de-interleaving the received data stream.

Another preferred embodiment comprises: the communication scheme further comprises, the further encoding the at least one parallel data stream according to the communication scheme and according to the set of parameters assigned to the communication device comprises, allocating to each of the at least one parallel data stream a distinct subset of orthogonal frequencies, the decoding the received data stream according to the communication scheme and according to the set of parameters assigned to the communication device comprises, decoding the received data stream with a distinct subset of orthogonal frequencies.

Another preferred embodiment comprises: the communication scheme further comprises, the further encoding the at least one parallel data stream according to the communication scheme and according to the set of parameters assigned to the communication device comprises, using means for performing distinct code spreading on the at least one parallel data stream, performing a summation operation on the at least one parallel data stream, the decoding the received data stream according to the communication scheme and according to the set of parameters assigned to the communication device comprises, using means for performing distinct code de-spreading on each of the received data streams.

Another preferred embodiment comprises: the means for performing distinct code spreading on each of the at least one parallel data stream comprises, using orthogonal codes, the means for performing distinct code de-spreading on each of the received data streams comprises, using orthogonal codes.

Another preferred embodiment comprises: the means for performing distinct code spreading on each of the at least one parallel data stream comprises, using Walsh codes, the means for performing distinct code de-spreading on each of the received data streams comprises, using Walsh codes.

Another preferred embodiment comprises: the means for performing distinct code spreading on each of the at least one parallel data stream comprises, using pseudo-orthogonal codes, the means for performing distinct code de-spreading on each of the received data streams comprises, using pseudo-orthogonal codes.

Another preferred embodiment comprises: the means for performing distinct code spreading on each of the at least one parallel data stream comprises, using OVSF codes, the means for performing distinct code de-spreading on each of the received data streams comprises, using OVSF codes.

Another preferred embodiment comprises: the communication scheme further comprises, the further encoding the at least one parallel data stream according to the communication scheme and according to the set of parameters assigned to the communication device comprises, allocating to each of the at least one parallel data stream a distinct subband of contiguous frequencies, the decoding the received data stream according to the communication scheme and according to the set of parameters assigned to the communication device comprises, decoding the received data stream with a distinct sub-band of contiguous frequencies.

Another preferred embodiment comprises: the communication scheme further comprises, the further encoding the at least one parallel data stream according to the communication scheme and according to the set of parameters assigned to the communication device comprises, allocating each of the at least one parallel data stream with a distinct spatial channel wherein each of the at least one parallel data stream is transmitted using a plurality of transmitting antennas using a MIMO technique, the decoding the received data stream according to the communication scheme and according to the set of parameters assigned to the communication device comprises, decoding the received data stream with a distinct spatial channel wherein each of the received data streams is received using a plurality of receiving antennas using a MIMO technique.

Another preferred embodiment comprises: the communication scheme further comprises, the further encoding the at least one parallel data stream according to the communication scheme and according to the set of parameters assigned to the communication device comprises, allocating to each of the at least one parallel data stream a separate time slot to incorporate time division multiple access, the decoding the received data stream according to the communication scheme and according to the set of parameters assigned to the communication device comprises, decoding the received data stream utilizing time division multiple access.

Regarding the various embodiments described herein, it is to be understood that the controller can perform the functions of network decoding and rateless decoding jointly. i.e. network decoding and rateless decoding could be done simultaneously.

What is claimed is:

1. A method for efficient transmission of electronic information comprising:
    providing a controller being capable of receiving and transmitting electronic information;
    providing a plurality of access points,
        each access point having a plurality of receivers capable of receiving electronic information, one of said plurality of receivers being designated a primary receiver, the rest being designated secondary receivers, said primary receiver being tuned to send and receive electronic information to and from a primary cell,
        said secondary receivers being tuned to receive electronic information from at least one designated neighboring cell;
    said controller performing the steps of
        assigning a communication device to said primary receiver of only one of said access points;
        assigning said communication device to at least one secondary receiver of said access points;
    generating a plurality of estimated symbols by,
        generating a received data stream by any of said receivers receiving through a communications channel at least one parallel data stream from said communication device,
        said at least one parallel data stream being created by said communication device performing the steps of,
            segmenting an original electronic data stream into a plurality of source blocks, said source blocks comprising sequential segments of said original electronic data stream,
            generating a set of encoded symbols by applying means for low rate code encoding to said plurality of source blocks,
            generating at least one parallel data stream by performing serial to parallel conversion on said set of encoded symbols,
            modulating said at least one parallel data stream according to a set of parameters,
            transmitting said at least one parallel data stream through a communications channel;
    any of said access points performing the steps of,
        de-modulating said received data stream according to said set of parameters,
        generating a plurality of linearly combined packets by using network coding to combine one or more of said plurality of estimated symbols,
        transmitting said plurality of linearly combined packets to said controller;
    said controller performing the steps of,
        recovering said original electronic data stream of said communication device by,
            receiving said plurality of linearly combined packets from said access points,
            recovering said plurality of estimated symbols by using network coding to linearly de-combine said plurality of linearly combined packets,
            recovering said plurality of linearly combined packets, using means for low rate code decoding;
    whereby electronic information may be transmitted in an efficient manner.

2. The method of claim 1 further comprising:
    said means for low rate code encoding comprises using rateless codes encoding;
    said means for low rate code decoding comprises using rateless codes encoding.

3. The method of claim 1 further comprising:
    said means for low rate code encoding comprises using erasure resilient codes;
    said means for low rate code decoding comprises using erasure resilient codes.

4. An improved communication system comprising:
a plurality of communication devices, each comprising,
    a receiver capable of receiving electronic information,
    a transmitter capable of transmitting electronic information,
    a computer processor, a computer memory including software instructions that cause said communication device to perform the steps of,
- segmenting an original electronic data stream into a plurality of source blocks, said source blocks comprising sequential segments of said original electronic data stream,
- generating a set of encoded symbols by applying means for low rate code encoding to said plurality of source blocks,
- receiving from a controller a set of parameters according to a communication scheme,
- generating at least one parallel data stream according to said set of parameters by performing serial to parallel conversion on said set of encoded symbols,
- modulating said at least one parallel data stream according to said set of parameters,
- further encoding said at least one parallel data stream according to said communication scheme and according to said set of parameters assigned to said communication device,
- transmitting said at least one parallel data stream;

a plurality of access points,
- each access point having a plurality of receivers capable of receiving electronic information, one of said plurality of receivers being designated a primary receiver, the rest being designated secondary receivers, said primary receiver being tuned to send and receive electronic information to and from a primary cell,
- said secondary receivers being tuned to receive electronic information from at least one designated neighboring cell,
- each access point further having,
  - a transmitter capable of transmitting electronic information,
  - a computer processor,
  - a computer memory including software instructions that cause said access point to perform the steps of,
    - generating a plurality of estimated symbols by,
      - receiving from said controller said set of parameters for each of said plurality of communication devices assigned to said access point,
      - generating a received data stream by receiving said at least one parallel data stream from any of said plurality of communication devices assigned to said access point,
      - decoding said received data stream according to said communication scheme and according to said set of parameters assigned to said communication device,
      - de-modulating said received data stream according to said set of parameters;
    - generating a plurality of linearly combined packets by using network coding to combine one or more of said plurality of estimated symbols,
    - transmitting said plurality of linearly combined packets to said controller;

said controller being capable of receiving and transmitting electronic information to and from each of said plurality of access points,
said controller comprising,
a computer processor,
a computer memory including software instructions that cause said controller to perform the steps of,
- assigning each of said plurality of communication devices to said primary receiver of only one of said access points,
- assigning each of said plurality of communication devices to at least one secondary receiver of said access points,
- determining said set of parameters for each of said communication devices according to said communication scheme,
  - said set of parameters relating to optimizing said communication scheme and being determined according to channel conditions between each of said communication devices and said receivers assigned thereto,
  - said set of parameters comprising determining the number of parallel data streams to be used by each of said communication devices,
  - said set of parameters further comprising determining the modulation order to be used,
- transmitting to said communication devices said set of parameters assigned thereto,
- transmitting to said access points said set of parameters for each of said communication devices assigned to each of said access points,
- recovering said original electronic data stream of said plurality of communication devices by,
  - receiving said plurality of linearly combined packets from said access points,
  - recovering said plurality of estimated symbols by using network coding to linearly de-combine said plurality of linearly combined packets,
  - recovering said plurality of linearly combined packets, using means for low rate code decoding;

whereby electronic information may be transmitted in an efficient manner.

5. The system of claim 4 further comprising:
said means for low rate code encoding comprises using rateless codes encoding;
said means for low rate code decoding comprises using rateless codes encoding.

6. The system of claim 4 further comprising:
said means for low rate code encoding comprises using erasure resilient codes;
said means for low rate code decoding comprises using erasure resilient codes.

7. The system of claim 4 further comprising:
said communication scheme further comprising,
said further encoding said at least one parallel data stream according to said communication scheme and according to said set of parameters assigned to said communication device comprises,
performing channel code encoding on each of said at least one parallel data stream,
said decoding said received data stream according to said communication scheme and according to said set of parameters assigned to said communication device comprises,
performing channel code decoding on said received data stream.

8. The system of claim 4 further comprising:
said communication scheme further comprising,
said further encoding said at least one parallel data stream according to said communication scheme and according to said set of parameters assigned to said communication device comprises,
interleaving each of said at least one parallel data stream, said decoding said received data stream according to said communication scheme and according to said set of parameters assigned to said communication device comprises,
de-interleaving said received data stream.

9. The system of claim 4 further comprising:
said communication scheme further comprising,
said further encoding said at least one parallel data stream according to said communication scheme and according to said set of parameters assigned to said communication device comprises,
allocating to each of said at least one parallel data stream a distinct subset of orthogonal frequencies,
said decoding said received data stream according to said communication scheme and according to said set of parameters assigned to said communication device comprises,
decoding said received data stream with a distinct subset of orthogonal frequencies.

10. The system of claim 4 further comprising:
said communication scheme further comprising,
said further encoding said at least one parallel data stream according to said communication scheme and according to said set of parameters assigned to said communication device comprises,
using means for performing distinct code spreading on each of said at least one parallel data stream,
performing a summation operation on said at least one parallel data stream,
said decoding said received data stream according to said communication scheme and according to said set of parameters assigned to said communication device comprises,
using means for performing distinct code de-spreading on each of said received data streams.

11. The system of claim 10 further comprising:
said means for performing distinct code spreading on each of said at least one parallel data stream comprises,
using orthogonal codes,
said means for performing distinct code de-spreading on each of said received data streams comprises,
using orthogonal codes.

12. The system of claim 10 further comprising:
said means for performing distinct code spreading on each of said at least one parallel data stream comprises,
using Walsh codes,
said means for performing distinct code de-spreading on each of said received data streams comprises,
using Walsh codes.

13. The system of claim 10 further comprising:
said means for performing distinct code spreading on each of said at least one parallel data stream comprises,
using pseudo-orthogonal codes,
said means for performing distinct code de-spreading on each of said received data streams comprises,
using pseudo-orthogonal codes.

14. The system of claim 10 further comprising:
said means for performing distinct code spreading on each of said at least one parallel data stream comprises,
using OVSF codes,
said means for performing distinct code de-spreading on each of said received data streams comprises,
using OVSF codes.

15. The system of claim 4 further comprising:
said communication scheme further comprising,
said further encoding said at least one parallel data stream according to said communication scheme and according to said set of parameters assigned to said communication device comprises,
allocating to each of said at least one parallel data stream a distinct subband of contiguous frequencies,
said decoding said received data stream according to said communication scheme and according to said set of parameters assigned to said communication device comprises,
decoding said received data stream with a distinct subband of contiguous frequencies.

16. The system of claim 4 further comprising:
said communication scheme further comprising,
said further encoding said at least one parallel data stream according to said communication scheme and according to said set of parameters assigned to said communication device comprises,
allocating each of said at least one parallel data stream with a distinct spatial channel wherein each of said at least one parallel data stream is transmitted using a plurality of transmitting antennas using a MIMO technique,
said decoding said received data stream according to said communication scheme and according to said set of parameters assigned to said communication device comprises,
decoding said received data stream with a distinct spatial channel wherein each of said received data streams is received using a plurality of receiving antennas using a MIMO technique.

17. The system of claim 4 further comprising:
said communication scheme further comprising,
said further encoding said at least one parallel data stream according to said communication scheme and according to said set of parameters assigned to said communication device comprises,
allocating to each of said at least one parallel data stream a separate time slot to incorporate time division multiple access,
said decoding said received data stream according to said communication scheme and according to said set of parameters assigned to said communication device comprises,
decoding said received data stream utilizing time division multiple access.

18. A method for efficient transmission of electronic information comprising:
providing a controller being capable of receiving and transmitting electronic information;
providing a plurality of access points,
each access point having a plurality of receivers capable of receiving electronic information, one of said plurality of receivers being designated a primary receiver, the rest being designated secondary receivers, said primary receiver being tuned to send and receive electronic information to and from a primary cell,
said secondary receivers being tuned to receive electronic information from at least one designated neighboring cell;
said controller performing the steps of
assigning each of a plurality of communication devices to said primary receiver of only one of said access points;
assigning each of said plurality of communication devices to at least one secondary receiver of said access points;

determining a set of parameters for each of said plurality of communications devices according to a communication scheme,
said set of parameters relating to optimizing said communication scheme and being determined according to channel conditions between each of said communication devices and said receivers assigned thereto,
said set of parameters comprising determining the number of parallel data streams to be used by each of said communication devices,
said set of parameters further comprising determining the modulation order to be used,
transmitting to said communication devices said set of parameters assigned thereto;
transmitting to said access points said set of parameters for each of said communication devices assigned to each of said access points;
generating a plurality of estimated symbols by,
generating a received data stream by any of said receivers receiving through a communications channel said at least one parallel data stream from any of said plurality of communication devices assigned to said access point,
said at least one parallel data stream being created by any of said plurality of communication devices performing the steps of,
segmenting an original electronic data stream into a plurality of source blocks, said source blocks comprising sequential segments of said original electronic data stream,
generating a set of encoded symbols by applying means for low rate code encoding to said plurality of source blocks,
generating at least one parallel data stream according to said set of parameters by performing serial to parallel conversion on said set of encoded symbols,
modulating said at least one parallel data stream according to said set of parameters,
further encoding each of said at least one parallel data stream according to said communication scheme and according to said set of parameters assigned to said communication device,
transmitting said at least one parallel data stream through a communications channel;
any of said access points performing the steps of,
decoding said received data stream according to said communication scheme and according to said set of parameters assigned to said communication device,
de-modulating said received data stream according to said set of parameters,
generating a plurality of linearly combined packets by using network coding to combine one or more of said plurality of estimated symbols,
transmitting said plurality of linearly combined packets to said controller;
said controller performing the steps of,
recovering said original electronic data stream of said plurality of communication devices by,
receiving said plurality of linearly combined packets from said access points,
recovering said plurality of estimated symbols by using network coding to linearly de-combine said plurality of linearly combined packets,
recovering said plurality of linearly combined packets, using means for low rate code decoding;

whereby electronic information may be transmitted in an efficient manner.

19. The method of claim 18 further comprising:
said means for low rate code encoding comprises using rateless codes encoding;
said means for low rate code decoding comprises using rateless codes encoding.

20. The method of claim 18 further comprising:
said means for low rate code encoding comprises using erasure resilient codes;
said means for low rate code decoding comprises using erasure resilient codes.

21. The method of claim 18 further comprising:
said communication scheme further comprising,
said further encoding said at least one parallel data stream according to said communication scheme and according to said set of parameters assigned to said communication device comprises,
performing channel code encoding on each of said at least one parallel data streams,
said decoding said received data stream according to said communication scheme and according to said set of parameters assigned to said communication device comprises,
performing channel code decoding on said received data stream.

22. The method of claim 18 further comprising:
said communication scheme further comprising,
said further encoding said at least one parallel data stream according to said communication scheme and according to said set of parameters assigned to said communication device comprises,
interleaving each of said at least one parallel data stream,
said decoding said received data stream according to said communication scheme and according to said set of parameters assigned to said communication device comprises,
de-interleaving said received data stream.

23. The method of claim 18 further comprising:
said communication scheme further comprising,
said further encoding said at least one parallel data stream according to said communication scheme and according to said set of parameters assigned to said communication device comprises,
allocating to each of said at least one parallel data stream a distinct subset of orthogonal frequencies,
said decoding said received data stream according to said communication scheme and according to said set of parameters assigned to said communication device comprises,
decoding said received data stream with a distinct subset of orthogonal frequencies.

24. The method of claim 18 further comprising:
said communication scheme further comprising,
said further encoding said at least one parallel data stream according to said communication scheme and according to said set of parameters assigned to said communication device comprises,
using means for performing distinct code spreading on said at least one parallel data stream;
performing a summation operation on said at least one parallel data stream;
said decoding said received data stream according to said communication scheme and according to said set of parameters assigned to said communication device comprises, using means for performing distinct code de-spreading on each of said received data streams.

25. The method of claim 24 further comprising:
said means for performing distinct code spreading on each of said at least one parallel data stream comprises,
using orthogonal codes,
said means for performing distinct code de-spreading on each of said received data streams comprises,
using orthogonal codes.

26. The method of claim 24 further comprising:
said means for performing distinct code spreading on each of said at least one parallel data stream comprises,
using Walsh codes,
said means for performing distinct code de-spreading on each of said received data streams comprises,
using Walsh codes.

27. The method of claim 24 further comprising:
said means for performing distinct code spreading on each of said at least one parallel data stream comprises,
using pseudo-orthogonal codes,
said means for performing distinct code de-spreading on each of said received data streams comprises,
using pseudo-orthogonal codes.

28. The method of claim 24 further comprising:
said means for performing distinct code spreading on each of said at least one parallel data stream comprises,
using OVSF codes,
said means for performing distinct code de-spreading on each of said received data streams comprises,
using OVSF codes.

29. The method of claim 18 further comprising:
said communication scheme further comprising,
said further encoding said at least one parallel data stream according to said communication scheme and according to said set of parameters assigned to said communication device comprises,
allocating to each of said at least one parallel data stream a distinct subband of contiguous frequencies,
said decoding said received data stream according to said communication scheme and according to said set of parameters assigned to said communication device comprises,
decoding said received data stream with a distinct sub-band of contiguous frequencies.

30. The method of claim 18 further comprising:
said communication scheme further comprising,
said further encoding said at least one parallel data stream according to said communication scheme and according to said set of parameters assigned to said communication device comprises,
allocating each of said at least one parallel data stream with a distinct spatial channel wherein each of said at least one parallel data stream is transmitted using a plurality of transmitting antennas using a MIMO technique,
said decoding said received data stream according to said communication scheme and according to said set of parameters assigned to said communication device comprises,
decoding said received data stream with a distinct spatial channel wherein each of said received data streams is received using a plurality of receiving antennas using a MIMO technique.

31. The method of claim 18 further comprising:
said communication scheme further comprising,
said further encoding said at least one parallel data stream according to said communication scheme and according to said set of parameters assigned to said communication device comprises,
allocating to each of said at least one parallel data stream a separate time slot to incorporate time division multiple access,
said decoding said received data stream according to said communication scheme and according to said set of parameters assigned to said communication device comprises,
decoding said received data stream utilizing time division multiple access.

* * * * *

UNITED STATES PATENT AND TRADEMARK OFFICE
CERTIFICATE OF CORRECTION

| | | |
|---|---|---|
| PATENT NO. | : 7,760,699 B1 | Page 1 of 1 |
| APPLICATION NO. | : 11/737014 | |
| DATED | : July 20, 2010 | |
| INVENTOR(S) | : Sandeep Malik | |

It is certified that error appears in the above-identified patent and that said Letters Patent is hereby corrected as shown below:

Title page reads: "(74) Attorney, Agent, or Firm-Robert J. Koch"

should read:

"(74) Attorney, Agent, or Firm-Ronald J. Koch"

Signed and Sealed this
Fifth Day of July, 2011

David J. Kappos
*Director of the United States Patent and Trademark Office*